(12) United States Patent
Yoon et al.

(10) Patent No.: US 11,307,783 B2
(45) Date of Patent: Apr. 19, 2022

(54) MEMORY CONTROLLER PERFORMING RECOVERY OPERATION USING RECOVERY CODE AND OPERATING METHOD THEREOF

(71) Applicant: SK hynix Inc., Gyeonggi-do (KR)

(72) Inventors: Jeong Hyun Yoon, Gyeonggi-do (KR); Sung Yeob Cho, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 213 days.

(21) Appl. No.: 16/595,065

(22) Filed: Oct. 7, 2019

(65) Prior Publication Data

US 2020/0310664 A1 Oct. 1, 2020

(30) Foreign Application Priority Data

Mar. 27, 2019 (KR) .......................... 10-2019-0035066

(51) Int. Cl.
*G06F 3/06* (2006.01)

(52) U.S. Cl.
CPC .......... *G06F 3/0634* (2013.01); *G06F 3/0619* (2013.01); *G06F 3/0625* (2013.01); *G06F 3/0653* (2013.01); *G06F 3/0673* (2013.01)

(58) Field of Classification Search
CPC ........ G06F 9/44; G06F 3/0634; G06F 3/0653; G06F 3/0625
See application file for complete search history.

(56) References Cited

U.S. PATENT DOCUMENTS

| | | | | |
|---|---|---|---|---|
| 10,083,114 | B2* | 9/2018 | Hong | G06F 3/0625 |
| 10,468,097 | B2* | 11/2019 | Jeon | G11C 11/5642 |
| 10,915,256 | B2* | 2/2021 | Mylavarapu | G06F 3/0638 |
| 2007/0157036 | A1* | 7/2007 | Jahagirdar | G06F 1/3293 713/300 |
| 2008/0082616 | A1* | 4/2008 | Morisawa | G06Q 10/107 709/206 |
| 2009/0089562 | A1* | 4/2009 | Schuchman | G06F 9/30105 712/228 |
| 2014/0040543 | A1* | 2/2014 | Natu | G06F 9/3851 711/105 |
| 2016/0132391 | A1* | 5/2016 | Thoen | G06F 11/1076 714/764 |
| 2016/0154454 | A1* | 6/2016 | Tu | G06F 13/16 713/323 |
| 2018/0089015 | A1* | 3/2018 | Branco | G06F 11/3037 |
| 2018/0307297 | A1* | 10/2018 | Semeria | G06F 1/3287 |
| 2021/0064257 | A1* | 3/2021 | Cariello | G11C 16/0483 |

FOREIGN PATENT DOCUMENTS

KR 10-2015-0008671 1/2015
KR 10-2016-0022671 3/2016

* cited by examiner

*Primary Examiner* — Raymond N Phan
(74) *Attorney, Agent, or Firm* — IP &T Group LLP

(57) ABSTRACT

A memory controller controls a data storage device including a nonvolatile memory in which a recovery code is stored. The memory controller includes: a mode converter for determining an operation mode of the data storage device as a normal mode or a sleep mode, according to power sensing information representing a power consumption of the data storage device, a recovery code storage including a nonvolatile memory, in which a recovery code for a recovery operation is stored, and a code executer for performing the recovery operation by executing the recovery code. The mode converter stores a recovery code address indicating a position of the nonvolatile memory at which the recovery code is stored.

20 Claims, 14 Drawing Sheets

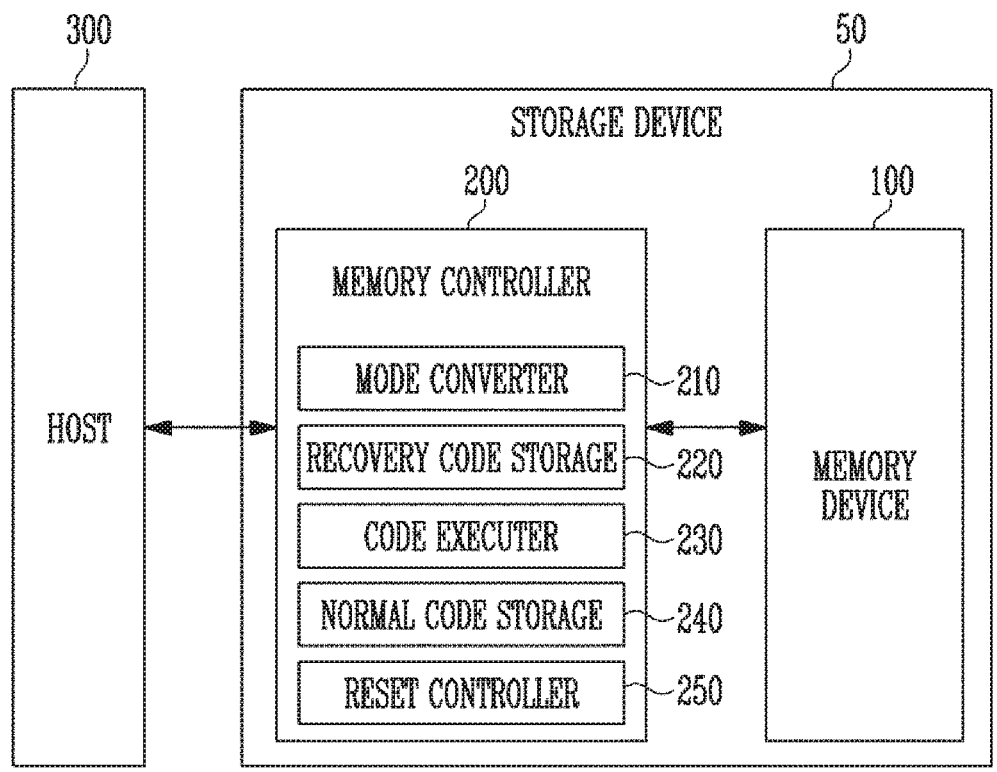
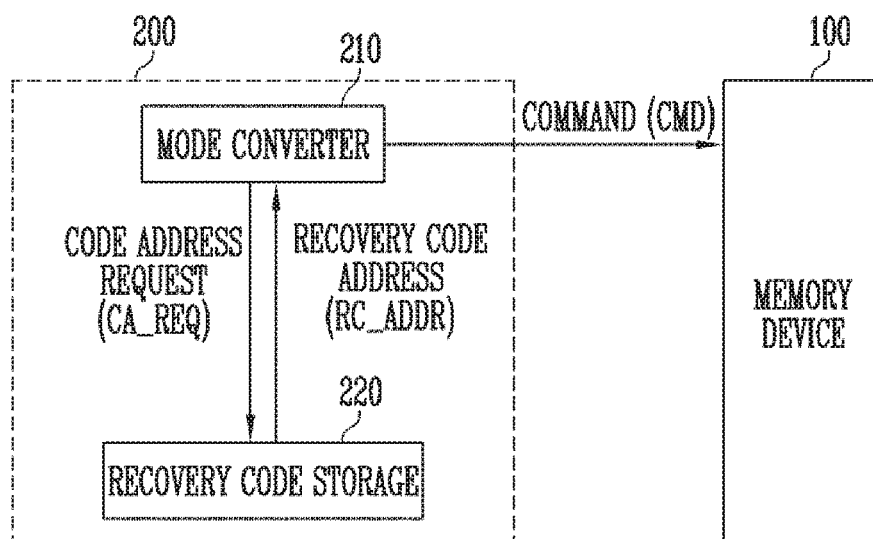

MEMORY CONTROLLER PERFORMING RECOVERY OPERATION USING RECOVERY CODE AND OPERATING METHOD THEREOF

CROSS-REFERENCE TO RELATED APPLICATION

The present application claims priority under 35 U.S.C. § 119(a) to Korean patent application number 10-2019-0035066, filed on Mar. 27, 2019, which is incorporated herein by reference in its entirety.

BACKGROUND

Field of Invention

The present disclosure generally relates to an electronic device, and more particularly, to a memory controller and an operating method thereof.

Description of Related Art

A storage device stores data under the control of a host device such as a computer, a smart phone or a smart pad. The storage device may have a magnetic disk, such as a Hard Disk Drive (HDD), on which such data is stored or a semiconductor memory, i.e., a nonvolatile memory, such as a Solid State Drive (SSD) or a memory card, on which such data is stored.

The storage device may include a memory device configured to store data and a memory controller configured to control the memory device. The memory device may be a volatile memory device or a nonvolatile memory device. Examples of a nonvolatile memory device include a Read Only Memory (ROM), a Programmable ROM (PROM), an Electrically Programmable ROM (EPROM), an Electrically Erasable and Programmable ROM (EEPROM), a flash memory, a Phase-change RAM (PRAM), a Magnetic RAM (MRAM), a Resistive RAM (RRAM), a Ferroelectric RAM (FRAM), and the like.

SUMMARY

Embodiments provide a memory controller configured to execute a recovery code stored in a nonvolatile memory in a normal mode operation, and an operating method of the memory controller.

In accordance with an aspect of the present disclosure, there is provided a memory controller for controlling a data storage device, the memory controller including: a mode converter configured to determine an operation mode of the data storage device as a normal mode or a sleep mode, according to power sensing information representing a power consumption of the data storage device, a recovery code storage including a nonvolatile memory, in which a recovery code for a recovery operation is stored and a code executer configured to perform the recovery operation by executing the recovery code, wherein the mode converter stores a recovery code address indicating a position of the nonvolatile memory at which the recovery code is stored.

In accordance with another aspect of the present disclosure, there is provided a method for operating a memory controller for controlling a data storage device, the method including: generating power sensing information by sensing power consumption of the data storage device, determining an operation mode of the data storage device as a normal mode or a sleep mode according to the power sensing information and storing a recovery code address indicating a position at which a recovery code stored in a nonvolatile memory, based on the operation mode of the data storage device.

In accordance with another aspect of the present disclosure, there is provided an operating method of a controller for controlling a memory device, the operating method including: copying a code address from a first memory to a second memory when the memory device enters a first mode; and performing a recovery operation on the memory device by executing a recovery code when the memory device exits the first mode and enters a second mode, wherein the first memory is nonvolatile, wherein the recovery code is stored in a region indicated by the code address within the first memory, and wherein the first and second memories are included in the controller.

BRIEF DESCRIPTION OF THE DRAWINGS

Various embodiments are described more fully below with reference to the accompanying drawings; however, features and aspects of the present invention may be embodied in different forms and thus should not be construed as limited to the embodiments set forth herein. Rather, these embodiments are provided so that this disclosure is thorough and complete and fully conveys the scope of the embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout. Also, throughout the specification, reference to "an embodiment," "another embodiment" or the like is not necessarily to only one embodiment, and different references to any such phrase are not necessarily to the same embodiment(s).

FIG. 1 is a block diagram illustrating a storage device.

FIG. 2 is a diagram illustrating an operation performed when the operation mode of the storage device is converted from a normal mode to a sleep mode.

DETAILED DESCRIPTION

Figure 3:
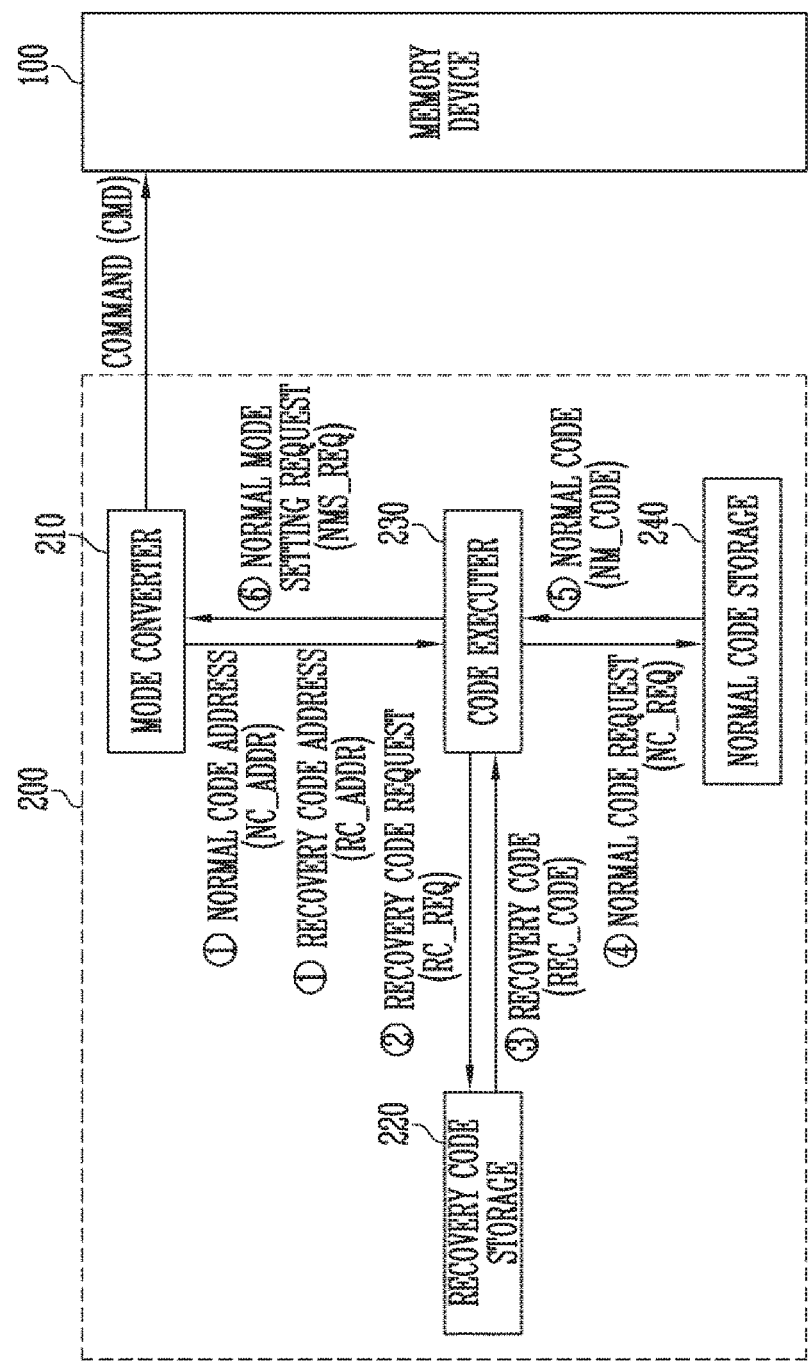
FIG. 3 is a diagram illustrating a process in which the operation mode of the storage device is converted from the sleep mode to the normal mode.

The specific structural and functional description disclosed herein is merely for the purpose of describing embodiments of the present invention. However, features and aspects of the present invention can be implemented in various other ways. Thus, the present invention is not limited to the embodiments set forth herein.

The present embodiments are illustrated and described in detail. However, the present invention is not limited to, or defined by, specific details. Rather, the present invention includes all changes, equivalents, or substitutes that do not depart from the spirit and technical scope of the present disclosure.

While terms such as "first" and "second" may be used to identify various components, such components must not be understood as being limited to the above terms. The above terms are used only to distinguish one component from another. For example, a first component may be referred to as a second component and vice versa, without departing from the scope of rights of the present disclosure.

It will be understood that when an element is referred to as being "connected" or "coupled" to another element, it can be directly connected or coupled to the other element or one or more intervening elements may also be present. In contrast, when an element is referred to as being "directly connected" or "directly coupled" to another element, no intervening elements are present. Other expressions describing relationships between components such as "~ between," "immediately ~ between" or "adjacent to ~" and "directly adjacent to ~" may be construed similarly.

The terms used in the present application are merely used to describe particular embodiments, and are not intended to limit the present invention. Singular forms in the present disclosure are intended to include the plural forms and vice versa, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

So far as not being differently defined, all terms used herein including technical or scientific terminologies have meanings that they are commonly understood by those skilled in the art to which the present disclosure pertains. The terms having the definitions as defined in the dictionary should be understood such that they have meanings consistent with the context of the related technique. So far as not being clearly defined in this application, terms should not be understood in an ideally or excessively formal way.

Description of techniques that are well known to the art to which the present disclosure pertains and are not directly related to the present disclosure may be omitted so as not to unnecessarily obscure features and aspects of the present invention.

Various embodiments of the present disclosure are described in detail below with reference to the accompanying drawings in order for those skilled in the art to be able to readily implement and practice the present invention.

FIG. 1 is a block diagram illustrating a storage device.

Referring to FIG. 1, the storage device 50 may include a memory device 100 and a memory controller 200.

The storage device 50 may be a device for storing data under the control of a host 300, such as a mobile phone, a smart phone, an MP3 player, a laptop computer, a desktop computer, a game console, a TV, a tablet PC or an in-vehicle infotainment.

The storage device 50 may be configured as any of various types of storage devices according to a host interface that is a communication scheme with the host 300. For example, the storage device 50 may be implemented with any one of a variety of types of storage devices, such as a Solid State Drive (SSD), a Multi-Media Card (MMC), an Embedded MMC (eMMC), a Reduced Size MMC (RS-MMC), a micro-MMC (micro-MMC), a Secure Digital (SD) card, a mini-SD card, a micro-SD card, a Universal Serial Bus (USB) storage device, a Universal Flash Storage (UFS) device, a Compact Flash (CF) card, a Smart Media Card (SMC), a memory stick, and the like.

The storage device 50 may be manufactured as any of various kinds of package types. For example, the storage device 50 may be manufactured as any of various kinds of package types such as a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

The memory controller 200 may control overall operations of the storage device 50.

When power is applied to the storage device 50, the memory controller 200 may execute firmware (FW). When the memory device 100 is a flash memory device, the memory controller 200 may execute FW such as an FTL for controlling communication between the host 300 and the memory device 100.

The memory controller 200 may include a mode converter 210. The mode converter 210 may determine whether the operation mode of the storage device 50 is a normal mode or a sleep mode, based on sensing information representing a power consumption of the storage device 50. The sensing information may be power sensing information including information on the power consumption.

The power consumption of the storage device 50 may be less than or equal to a reference consumption, or greater than the reference consumption. The reference consumption may be preset. The reference consumption may be changed.

When the power consumption of the storage device is less than or equal to the reference consumption, the storage device 50 may operate in the sleep mode. The sleep mode may be an operation mode of the storage device 50 when the power consumption of the storage device 50 is low. That is, when the power consumption of the storage device is less than or equal to the reference consumption, the mode converter 210 may determine the operation mode of the storage device 50 to be the sleep mode.

When the operation mode of the storage device 50 is the sleep mode, the storage device 50 may perform first operations. The first operations may include minimal operations for operating the storage device 50. The minimal operations for operating the storage device 50 may be operations for maintaining a power-on state of the storage device 50.

In another embodiment, the power consumption of the storage device 50 may exceed the reference consumption. When the power consumption of the storage device 50 exceeds the reference consumption, the storage device 50 may operate in the normal mode. That is, the normal mode may be an operation mode of the storage device when the power consumption exceeds the reference consumption. Consequently, when the power consumption exceeds the reference consumption, the mode converter 210 may determine the operation mode of the storage device 50 to be the normal mode.

When the operation mode of the storage device 50 is the normal mode, the storage device 50 may perform second operations. The second operations may include some of the first operations. The second operations may be general operations performed by the storage device 50. The general operations performed by the storage device 50 may include a program operation, a read operation, and an erase operation. The general operations performed by the storage device 50 may include various operations in addition to the above operations.

The mode converter 210 may convert the operation mode of the storage device 50, based on the power consumption of the storage device 50. The storage device 50 may be a data storage device configured to store data. In an embodiment, when the power consumption of the storage device 50, while in the sleep mode, exceeds the reference consumption, the mode converter 210 may convert the operation mode of the storage device 50 from the sleep mode to the normal mode. On the contrary, when the power consumption of the storage device 50, while in the normal mode, is less than or equal to the reference consumption, the mode converter 210 may convert the operation mode of the storage device 50 from the normal mode to the sleep mode.

The memory controller 200 may include a recovery code storage 220. The recovery code storage 220 may store a recovery code REC_CODE. The recovery code storage 220 may also store a recovery code address RC_ADDR representing a position at which the recovery code REC_CODE is stored within the recovery code storage 220. The recovery code REC_CODE may be a code for a recovery operation. Specifically, the recovery code REC_CODE may be a code for determining whether data stored in the memory controller 200 is error-free or error-correctable. Also, the recovery code REC_CODE may be a code for error-correcting data. The recovery code REC_CODE may be executed when the operation mode of the storage device 50 is converted from the sleep mode to the normal mode.

Conventionally, the recovery code REC_CODE was stored in a Random Access Memory (RAM), i.e., a volatile memory. Hence, when an abnormal situation such as Sudden Power Off (SPO) occurred while the storage device 50 was in the sleep mode, the recovery code REC_CODE might be changed, e.g., become corrupted. Therefore, normal recovery was impossible even when the recovery code REC_CODE was executed, and accordingly, an operation of the storage device 50 might be stopped.

However, in the present disclosure, the recovery code REC_CODE may be stored in a Read Only Memory (ROM) together with a booting code for a booting operation of the storage device 50. The ROM may be configured with a nonvolatile memory. In the present disclosure, the recovery code REC_CODE may be stored in the recovery code storage 220. The recover code storage 220 may include a nonvolatile memory. That is, the recovery code REC_CODE may be stored in the nonvolatile memory.

Thus, the integrity of recovery code REC_CODE stored in the recovery code storage 220 can be maintained even when power is off. In addition, since the recovery code REC_CODE is stored in the nonvolatile memory, the recovery code REC_CODE is not changed, even when the storage device 50 is in an abnormal state.

In the present disclosure, the recovery code address RC_ADDR may be stored in the mode converter 210. In addition, after the recovery code REC_CODE is executed, a normal code address NC_ADDR for executing a normal code NM_CODE may be stored in the mode converter 210. The normal code address NC_ADDR may represent a position at which the normal code NM_CODE is stored within a normal code storage 240. The mode converter 210 may include a nonvolatile memory in which the recovery code address RC_ADDR and the normal code address NC_ADDR are stored.

Consequently, since the recovery code REC_CODE is stored in the nonvolatile memory, the reliability of a recovery operation can be ensured. Further, when the recovery operation is performed, an operation of the storage device 50 is not stopped.

The memory controller 200 may include a code executer 230. The code executer 230 may perform an operation when the operation mode of the storage device 50 is converted from the sleep mode to the normal mode based on the power consumption of the storage device 50. Specifically, the code executer 230 may execute a recovery code REC_CODE and a normal code NM_CODE respectively indicated by the normal code address NC_ADDR and the recovery code address RC_ADDR, which are received from the mode converter 210.

In an embodiment, the code executer 230 may perform a recovery operation by executing the recovery code REC_CODE. Also, after the recovery code REC_CODE is executed, the code executer 230 may execute the normal code NM_CODE. When the execution of the normal code NM_CODE is completed, the code executer 230 may output a normal mode setting request NMS_REQ for allowing the storage device 50 to operate in the normal mode.

The memory controller 200 may include the normal code storage 240. The normal code storage 240 may store a normal code NM_CODE and a normal code address NC_ADDR. The normal code storage 240 may be configured with a volatile memory. The normal code NM_CODE may be a code executed after the recovery code REC_CODE is executed. Also, the normal code NM_CODE may be a code executed such that the storage device 50 operates in the normal mode.

That is, the normal code NM_CODE may be for performing a background operation before the storage device 50 operates in the normal mode. In order to execute the normal code NM_CODE after the recovery code REC_CODE is executed, the mode converter 210 may store the normal code address NC_ADDR indicating where the normal code NM_CODE is stored. When the normal code NM_CODE is executed, the storage device 50 may operate in the normal mode.

The memory controller 200 may include a reset controller 250. The reset controller 250 may perform a reset operation in response to a reset request RST_REQ received from the code executer 230. The reset operation may be performed when the code executer 230 fails to error-correct the data stored in the memory controller 200 even by executing the recovery code REC_CODE. Specifically, the reset operation may be performed based on a result of the recovery operation performed when the operation mode of the storage device 50 is converted from the sleep mode to the normal mode. When the code executer 230 fails to error-correct the data stored in the memory controller 200 even by executing the recovery code REC_CODE, the reset operation may be performed.

The memory device 100 may store data. The memory device 100 operates under the control of the memory controller 200. The memory device 100 may include a memory cell array including a plurality of memory cells for storing data. The memory cell array may include a plurality of memory blocks. Each memory block may include a plurality of memory cells. One memory block may include a plurality of pages. In an embodiment, the page may be a unit for storing data in the memory device 100 or reading data stored in the memory device 100. The memory block may be a unit for erasing data.

In an embodiment, the memory device 100 may be a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like. In this specification, by way of example, a case where the memory device 100 is a NAND flash memory is assumed and described.

In an embodiment, the memory device 100 may be implemented in a three-dimensional array structure. The present disclosure may be applied to not only a flash memory device in which a charge storage layer is configured with a Floating Gate (FG) but also a Charge Trap Flash (CTF) in which a charge storage layer is configured with an insulating layer.

In an embodiment, each of the memory cells included in the memory device 100 may be configured as a Single Level Cell (SLC) for storing one data bit. Also, each of the memory cells included in the memory device 100 may be configured as a Multi-Level Cell (MLC) for storing two data bits, a Triple Level Cell (TLC) for storing three data bits, or a Quad Level Cell (QLC) for storing four data bits.

The memory device 100 is configured to receive a command and an address from the memory controller 200 and access an area selected by the address in the memory cell array. That is, the memory device 100 may perform an operation corresponding to the command on the area selected by the address. For example, the memory device 100 may perform a write (program) operation, a read operation, and an erase operation. In the program operation, the memory device 100 may program data in the area selected by the address. In the read operation, the memory device 100 may read data from the area selected by the address. In the erase operation, the memory device 100 may erase data stored in the area selected by the address.

In an embodiment, the memory controller 200 may receive data and a Logical Block Address (LBA) from the host 300, and translate the LBA into a Physical Block Address (PBA) representing addresses of memory cells included in the memory device 100, in which data is to be stored. Also, the memory controller 200 may store, in a buffer memory, mapping information that establishes a mapping relationship between the LBA and the PBA.

The memory controller 200 may control the memory device 100 to perform a program operation, a read operation, an erase operation, or the like in response to a request from the host 300. In the program operation, the memory controller 200 may provide a program command, a PBA, and data to the memory device 100. In the read operation, the memory controller 200 may provide a read command and a PBA to the memory device 100. In the erase operation, the memory controller 200 may provide an erase command and a PBA to the memory device 100.

In an embodiment, the memory controller 200 may autonomously generate a program command, an address, and data without any request from the host 300, and transmit the program command, the address, and the data to the memory device 100. For example, the memory controller 200 may provide the command, the address, and the data to the memory device 100 to perform background operations such as a program operation for wear leveling and a program operation for garbage collection.

In an embodiment, the memory controller 200 may control at least two memory devices 100. The memory controller 200 may control the memory devices according to an interleaving scheme so as to improve operational performance.

The host 300 may communicate with the storage device 50, using at least one of various communication protocols, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a Universal Flash Storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

FIG. 2 is a diagram illustrating an operation performed when the operation mode of the storage device is converted from the normal mode to the sleep mode.

Referring to FIG. 2, the memory controller 200 may include the mode converter 210 and the recovery code storage 220. In FIG. 2, a case where the code executer 230, the normal code storage 240, and the reset controller 250, which are included in the memory controller 200, are omitted is assumed.

The mode converter 210 may receive sensing information representing a power consumption of the storage device 50. The storage device 50 may be a data storage device configured to store data. The sensing information may be power sensing information including information on the power consumption. The power consumption of the storage device 50 may be less than or equal to a reference consumption, or greater than the reference consumption. The reference consumption may be preset. The reference consumption may be changed.

The mode converter 210 may determine any one of the normal mode and the sleep mode as an operation mode of the storage device 50, based on the sensing information representing the power consumption of the storage device 50.

In an embodiment, when the power consumption of the storage device 50 is equal to or smaller than the reference consumption, the mode converter 210 may determine the sleep mode as the operation mode of the storage device 50. The sleep mode may be an operation mode of the storage device 50 when the power consumption of the storage device 50 is low.

In another embodiment, the power consumption of the storage device 50 may exceed the reference consumption. When the power consumption of the storage device 50 exceeds the reference consumption, the mode converter 210 may determine the operation mode of the storage device 50 to be the normal mode.

FIG. 2 illustrates an operation after the mode converter 210 receives sensing information including a power consumption that is equal to or smaller than the reference consumption while the storage device 50 is operating in the normal mode. When the power consumption of the storage device 50, while operating in the normal mode, is less than or equal to the reference consumption, the mode converter 210 may convert the operation mode of the storage device 50 from the normal mode to the sleep mode. When the power consumption of the storage device 50 is less than or equal to the reference consumption, the mode converter 210 may output a code address request CA_REQ to the recovery code storage 220. That is, when the operation mode of the storage device 50 is converted from the normal mode to the sleep mode, the mode converter 210 may output the code address request CA_REQ.

The code address request CA_REQ may be for receiving a recovery code address RC_ADDR. The code address request CA_REQ may request an address at which a recovery code REC_CODE is stored. The recovery code REC_CODE may be executed when the operation mode of the storage device 50 is converted from the sleep mode to the normal mode.

The recovery code storage 220 may store a recovery code REC_CODE. The recovery code REC_CODE may be stored in the recovery code storage 220 when the storage device 50 is produced. Also, the recovery code storage 220 may store a recovery code address RC_ADDR representing a position at which the recovery code REC_CODE is stored within the recovery code storage 220. The recovery code storage 220 may include a nonvolatile memory. That is, the recovery code REC_CODE and the recovery code address RC_ADDR may be stored in the nonvolatile memory. Thus, the recovery code REC_CODE stored in the recovery code storage 220 can be maintained even when power is off. In addition, since the recovery code REC_CODE and the recovery code address RC_ADDR are stored in the nonvolatile memory, the recovery code REC_CODE and the recovery code address RC_ADDR are not changed or corrupted even in an abnormal state of the storage device 50.

Consequently, since the recovery code REC_CODE is stored in the nonvolatile memory, the reliability of a recovery operation can be ensured. Further, when the recovery operation is performed, an operation of the storage device 50 is not stopped.

The recovery code REC_CODE may be executed when the operation mode of the storage device 50 is converted from the sleep mode to the normal mode. That is, when the power consumption of the storage device 50 exceeds the reference consumption, which may be the result of the power consumption increasing, the recovery code REC_CODE may be executed.

In an embodiment, an error correction operation may be performed based on the recovery code REC_CODE. Specifically, the error correction operation may be an operation of error-correcting data in which an error Occurs.

The recovery code storage 220 may receive a code address request CA_REQ from the mode converter 210. The recovery code storage 220 may output a recovery code address RC_ADDR in response to the code address request CA_REQ. The recovery code address RC_ADDR may represent a position at which the recovery code REC_CODE is stored within the recovery code storage 220. The mode converter 210 may output the recovery code address RC_ADDR received from the recovery code storage 220, when the operation mode of the storage device 50 is converted from the sleep mode to the normal mode.

The mode converter 210 may receive a recovery code address RC_ADDR. The received recovery code address RC_ADDR may be stored in the nonvolatile memory included in the mode converter 210.

When the mode converter 210 receives the recovery code address RC_ADDR, the storage device 50 may operate in the sleep mode. The sleep mode may be an operation mode of the storage device 50 when the power consumption of the storage device 50 is equal to or smaller than the reference consumption.

The storage device 50 may perform first operations in the sleep mode. The first operations may include minimal operations for operating the storage device 50. The minimal operations for operating the storage device 50 may be operations for maintaining a power-on state of the storage device 50. The mode converter 210 may output a command CMD to the memory device 100 such that the storage device 50 operates in the sleep mode. The memory device 100 may perform an operation corresponding to the command CMD.

In another embodiment, the recovery code address RC_ADDR may be stored in the mode converter 210 when the storage device 50 is produced. When the recovery code address RC_ADDR is stored in the mode converter 210 before the code address request CA_REQ is output, the mode converter 210 may not output the code address request CA_REQ. That is, since the recovery code REQ_CODE has already been stored in the mode converter 210 before the storage device 50 operates in the sleep mode, the code address request CA_REQ may be omitted.

The mode converter 210 may store a normal code address NC_ADDR in addition to the recovery code address RC_ADDR shown in FIG. 2. The mode converter 210 may store a normal code address NC_ADR when the storage device 50 is initialized. The normal code address NC_ADDR may represent a position at which a normal code NM_CODE is stored within the normal code storage 240.

The mode converter 210 may receive a normal code address NC_ADDR from the memory device 100 when the storage device 50 is initialized. The received normal code address NC_ADDR may be stored in the nonvolatile memory included in the mode converter 210.

The normal code NM_CODE may be executed after the recovery code REC_CODE is executed. The normal code NM_CODE may be executed such the storage device 50 operates in the normal mode. That is, the normal code NM_CODE may be for performing a background operation before the storage device 50 operates in the normal mode. When the normal code NM_CODE is executed, the storage device 50 may operate in the normal mode.

FIG. 3 is a diagram illustrating a process in which the operation mode of the storage device is converted from the sleep mode to the normal mode.

Referring to FIG. 3, the memory controller 200 may include the mode converter 210, the recovery code storage 220, the code executer 230, and the normal code storage

240. In FIG. 3, the reset controller 250, which may be included in the memory controller 200, is omitted for clarity.

When the operation mode of the storage device 50 is converted from the sleep mode to the normal mode, the mode converter 210 may output a normal code address NC_ADDR and a recovery code address RC_ADDR (①). The normal code address NC_ADDR may represent a position at which a normal code NM_CODE is stored within the normal code storage 240, and the recovery code address RC_CODE may represent a position at which a recovery code REC_CODE is stored within the recovery code storage 220. The normal code address NC_ADDR may be received from the memory device 100 when the storage device 50 is initialized, to be stored in the mode converter 210. The recovery code address RC_ADDR may be stored in the mode converter 210 when the storage device 50 is produced or when the operation mode of the storage device 50 is converted from the normal mode to the sleep mode. The storage device 50 may be a data storage device configured to store data.

In an embodiment, the normal code address NC_ADDR and the recovery code address RC_ADDR may be stored in the nonvolatile memory included in the mode converter 210.

In an embodiment, the code executer 230 may receive the normal code address NC_ADDR and the recovery code address RC_ADDR from the mode converter 210. The code executer 230 may perform an operation by executing the normal code NM_CODE indicated by the normal code address NC_ADDR and the recovery code REC_CODE indicated by the recovery code address RC_ADDR when the operation mode of the storage device 50 is converted from the sleep mode to the normal mode.

Specifically, the code executer 230 may output a recovery code request RC_REQ corresponding to the recovery code address RC_ADDR (2). The recovery code request RC_REQ may be a request for acquiring a recovery code REC_CODE stored in the recovery code storage 220. The code executer 230 may acquire a recovery code REC_CODE corresponding to the recovery code address RC_ADDR.

The code executer 230 may execute the recovery code REC_CODE. The code executer 230 may perform a recovery operation by executing the recovery code REC_CODE.

Specifically, an abnormal situation such as Sudden Power Off (SPO) may occur in the state in which the operation mode of the storage device 50 is the sleep mode. When an abnormal situation occurs in the state in which the operation mode of the storage device 50 is the sleep mode, code data and meta data, which are stored in a RAM of the memory controller 200, may be changed, e.g., corrupted. That is, an error such as a bit flip may occur in the code data and the meta data. The code executer 230 may perform an error correction operation to the code data and meta data by executing the recovery code REC_CODE. The code executer 230 may error-correct the code data and meta data, through the error correction operation.

In an embodiment, the recovery code storage 220 may store a recovery code REC_CODE. Also, the recover code storage 220 may store a recovery code address RC_ADDR indicating the recovery code REC_CODE. 10o The recovery code REC_CODE may be a code for recovery operation. Specifically, the recovery code REC may be a code for determining whether data stored in the memory controller 200 is error-correctable. Also, the recovery code REC_CODE may be a code for error-correcting the data. The recovery code REC_CODE may be executed when the operation mode of the storage device 50 is converted from the sleep mode to the normal mode.

In an embodiment, the recovery code storage 220 may include a nonvolatile memory. That is, the recovery code REC_CODE may be stored in the nonvolatile memory. Thus, the recovery code REC_CODE and the recovery code address RC_ADDR, which are stored in the recovery code storage 220, can be maintained even when power is off. In addition, since the recovery code REC_CODE and the recovery code address RC_ADDR are stored in the nonvolatile memory, the recovery code REC_CODE and the recovery code address RC_ADDR are not changed or corrupted even in an abnormal state of the storage device 50.

The recovery code storage 220 may receive the recovery code request RC_REQ from the code executer 230 (②). The recovery code request RC_REQ may be a request output based on the recover code address RC_ADDR. The recovery code storage 220 may output a recovery code REC_CODE corresponding to the code address RC_ADDR in response to the recovery code request RC_REQ (③). The code executer 230 may execute the recovery code REC_CODE received from the recovery code storage 220. The code executer 230 may perform a recovery operation by executing the recovery code REC_CODE.

In an embodiment, the code executer 230 may output a normal code request NC_REQ after the code executer 230 executes the recovery code REC_CODE.

Specifically, the code executer 230 may output a normal code request NC_REQ corresponding to the normal code address NC_ADDR (④). The normal code request RC_REQ may be request for acquiring a normal code NM_CODE stored in the normal code storage 240. The code executer 230 may acquire a normal code NM_CODE corresponding to the normal code address NC_ADDR (⑤).

The normal code NM_CODE may be a code executed after the recovery code REC_CODE is executed. Also, the normal code NM_CODE may be a code executed such that the storage device 50 operates in the normal mode. That is, the normal code NM_CODE may be a code for performing a background operation before the storage device 50 operates in the normal mode.

In an embodiment, the normal code storage 240 may store a normal code NM_CODE and a normal code address NC_ADDR. The normal code NM_CODE may be a code executed after the recovery code REC_CODE is executed. The normal code NM_CODE may be executed when the operation mode of the storage device 50 is converted from the sleep mode to the normal mode. The normal code address NC_ADDR may represent a position at which the normal code NM_CODE is stored within the normal code storage 240.

In an embodiment, the normal code storage 240 may be configured with a volatile memory or nonvolatile memory. That is, when the normal code storage 240 is configured with the volatile memory, the normal code NM_CODE and the normal code address NC_ADDR may be maintained when power is off. On the other hand, when the normal code storage 240 is configured with the nonvolatile memory, the normal code NM_CODE and the normal code address NC_ADDR may be maintained even when power is off. When the normal code storage 240 is configured with the nonvolatile memory, the normal code NM_CODE and the normal code address NC_ADDR may not be changed or corrupted even in an abnormal state of the storage device 50.

The normal code storage 240 may receive the normal code request NC_REQ from the code executer 230 (④). The normal code request NC_REQ may be a request output based on the normal code address NC_ADDR. The normal code storage 240 may output a normal code NM_CODE corresponding to the normal code address NC_ADDR in response to the normal code request NC_REQ.

The code executer 230 may execute the normal code NM_CODE received from the normal code storage 240. The code executer 230 may perform a background operation for allowing the storage device 50 to operate in the normal mode by executing the normal code NM_CODE.

The code executer 230 may allow the storage device 50 to operate in the normal mode by executing the normal code NM_CODE. When the execution of the normal code NM_CODE is completed, the code executer 230 may output a normal mode setting request NMS_REQ for allowing the storage device 50 to operate in the normal mode (⑥).

When the code executer 230 outputs the normal mode setting request NMS_REQ to the mode converter 210, the storage device 50 may perform second operations. The second operations may include some of the first operations. The second operations may be general operations performed by the storage device 50. The general operations performed by the storage device 50 may include a program operation, a read operation, and an erase operation. The general operations performed by the storage device 50 may include various operations in addition to the above operations. Therefore, the mode converter 210 may output a command to the memory device 100 so as to perform a normal operation.

Figure 4:
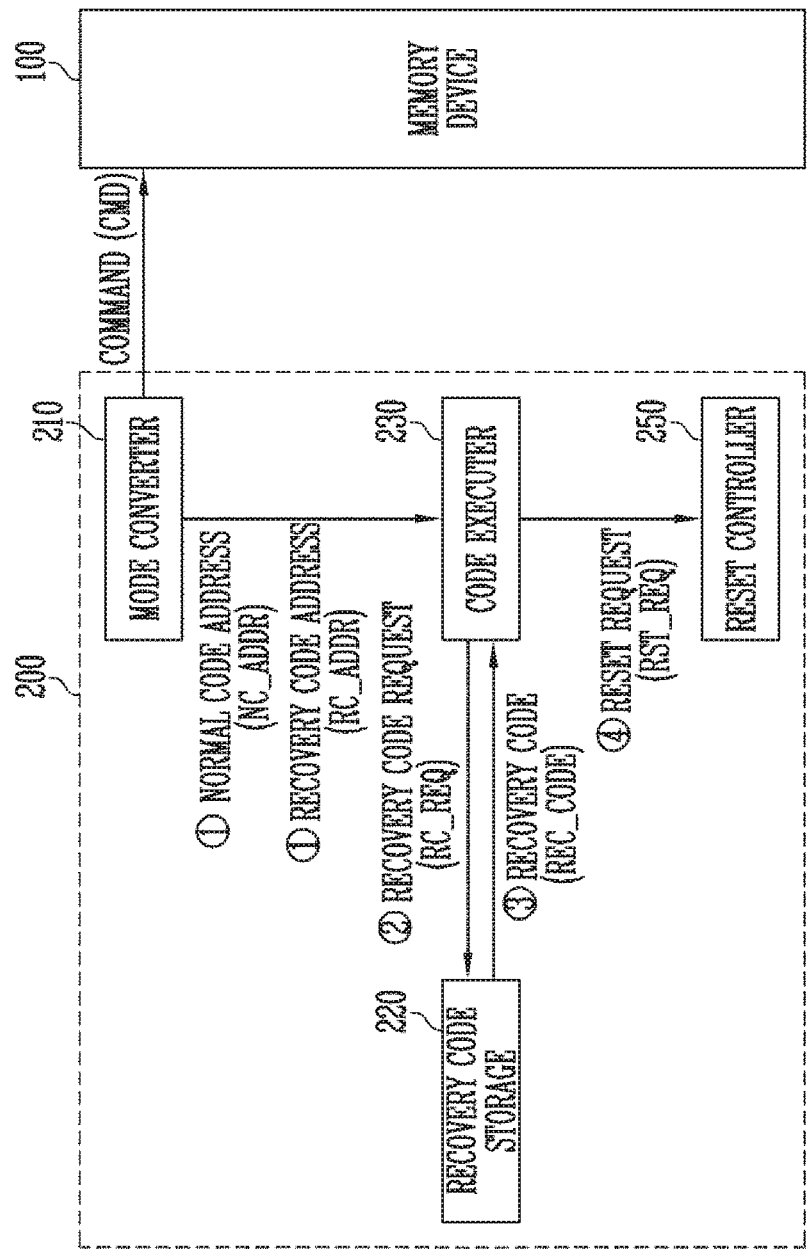
FIG. 4 is a diagram illustrating a reset operation of the storage device when the operation mode of the storage device cannot be converted from the sleep mode to the normal mode.

FIG. 4 is a diagram illustrating a reset operation of the storage device when the operation mode of the storage device cannot be converted from the sleep mode to the normal mode.

Referring to FIG. 4, the memory controller 200 may include the mode converter 210, the recovery code storage 220, the code executer 230, and the reset controller 250. In FIG. 4, the normal code storage 240, which may be included in the memory controller 200, is omitted for clarity.

FIG. 4 illustrates that the normal code storage 240 is excluded from the memory controller 200 shown in FIG. 3, and the reset controller 250 is included. Therefore, contents overlapping with those shown in FIG. 3 will be omitted, and the reset controller 250 that is not described in FIG. 3 will be mainly described.

When the operation mode of the storage device 50 is converted from the sleep mode to the normal mode, the mode converter 210 may output a normal code address NC_ADDR and a recovery code address RC_ADDR (①).

The code executer 230 may receive a normal code address NC_ADDR and a recovery code address RC_ADDR from the mode converter 210. The code executer 230 may output a recovery code request RC_REQ corresponding to the recovery code address RC_ADDR (②). The recovery code storage 220 may output a recovery code REC_CODE corresponding to the recovery code address RC_ADDR in response to the recovery code request RC_REQ (③). The code executer 230 may execute the recovery code REC_CODE received from the recovery code storage 220. The code executer 230 may perform a recovery operation by executing the recovery code REC_CODE.

The recovery operation may include an operation of determining whether data is error-correctable. The data in which the error occurs may be correctable or uncorrectable, which may be based on the number of error bits in the data. In the case of uncorrectable error data, the number of error bits may exceed a correctable bit number.

In an embodiment, when the data is error-correctable, the code executer 230 may receive a normal code NM_CODE from the normal code storage 240, after the data is error-corrected as described in FIG. 3. However, when the error correction of the data is impossible, the code executer 230 cannot receive the normal code NM_CODE from the normal code storage 240.

When the error correction of the data is impossible, the code executer 230 may output a reset request RST_REQ for resetting the storage device 50 to the reset controller 250 (④). The reset controller 250 may control the storage device 50 to perform an operation in a booting mode by receiving the reset request RST_REQ. That is, since the recovery operation cannot be completed by performing the recover code REC_CODE, the reset controller 250 may control the storage device 50 to operate in the booting mode. After the storage device 50 operates in the booting mode, the mode converter 210 may output a command for performing first operations or second operations to the memory device 100, based on a power consumption of the storage device 50.

The first operations may include minimal operations of operating the storage device 50. The minimal operations for operating the storage device 50 may be operations for maintains a power-on state of the storage device 50. The mode converter 210 may output a command to the memory device 100 such that the storage device 50 operates in the sleep mode. The memory device 100 may perform an operation corresponding to the command.

The second operations may be general operations performed by the storage device 50. The general operation performed by the storage device 50 may include a program operation, a read operation, and an erase operation. The general operation performed by the storage device 50 may include various operations in addition to the above operations. Therefore, the mode converter 210 may output a command to the memory device 100 so as to perform a normal operation.

Figure 5:
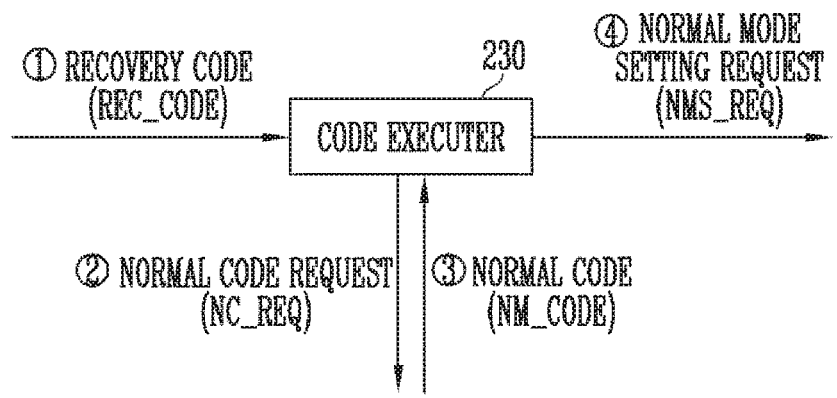
FIG. 5 is a diagram illustrating an operation after a recovery code is received.

FIG. 5 is a diagram illustrating an operation after a recovery code REC_CODE is received.

Referring to FIG. 5, the code executer 230 may receive a recovery code REC_CODE (①). The recovery code REC_CODE may be a code stored in the recovery code storage 220. Since the recovery code storage 220 is configured with a nonvolatile memory, the recovery code REC_CODE may not be changed or corrupted even in an abnormal state of the storage device 50. Thus, when the code executer 230 executes the recovery code REC_CODE, the reliability of a recovery operation can be ensured. In addition, when a recovery operation is performed, an operation of the storage device 50 is not stopped. The storage device 50 may be a data storage device configured to store data.

The code executer 230 may execute the received recovery code REC_CODE. When the recovery code REC_CODE is executed, a recovery operation may be performed. The recovery operation may include an operation of determining whether data is error-correctable. The data in which the error occurs may be correctable or uncorrectable, based on the result of determining the number of error bits in the data. Error correction may be impossible when the number of error bits exceeds a correctable bit number.

FIG. 5 illustrates both a case where there is no data in which an error occurs and a case where error-containing data is error-correctable. When there is no data in which an error occurs, the recovery operation may be omitted. When error-containing data is error-correctable, the error may be corrected by executing the recovery code REC_CODE.

When there is no data in which an error occurs or when the error correction of the data is completed, the code executer 230 may output a normal code request NC_REQ (②). The normal code request NC_REQ may be output to the normal code storage 240. The normal code request NC_REQ may be a request for acquiring a normal code NM_CODE stored in the normal code storage 240. That is, the code executer 230 may output the normal code request NC_REQ so as to execute the normal code NM_CODE after the recovery code REC_CODE is executed.

In an embodiment, the code executer 230 may receive a normal code NM_CODE that responds to the normal code request NC_REQ (③). The code executer 230 may execute the received normal code NM_CODE. The normal code NM_CODE may be a code executed such that the storage device 50 operates in the normal mode. The code executer 230 may perform a background operation for allowing the storage device 50 to operate in the normal mode by executing the normal code NM_CODE.

When the code executer 230 completely executes the normal code NM_CODE, the code executer 230 may output a normal mode setting request NMS_REQ. Specifically, the code executer 230 may output the normal mode setting request NMS_REQ to the mode converter 210 (④). When the mode converter 210 receives the normal mode setting request NMS_REQ, the mode converter 210 may perform operations for allowing the storage device 50 to operate in the normal mode. In an embodiment, an operation performed by the mode converter 210 may be an operation of outputting a command for performing a program operation, a read operation, or an erase operation.

Figure 6:
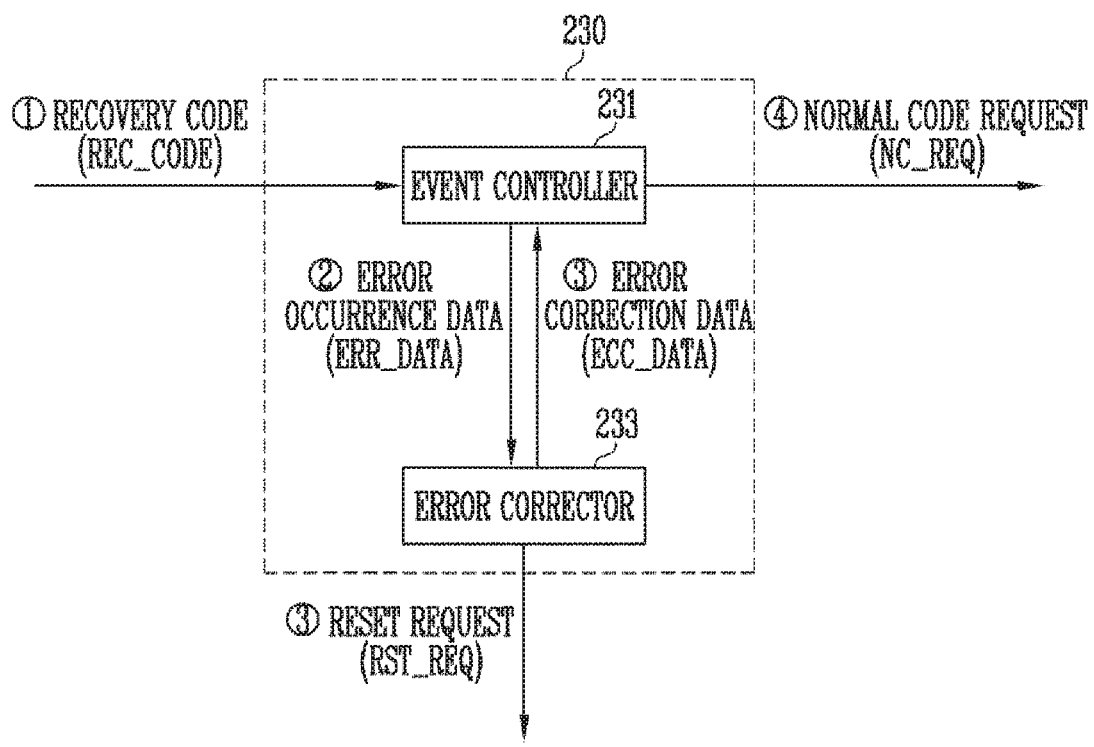
FIG. 6 is a diagram illustrating an operation of the storage device after the recovery code is executed.

FIG. 6 is a diagram illustrating an operation of the storage device after the recovery code REC_CODE is executed.

Referring to FIG. 6, the code executer 230 may include an event controller 231 and an error corrector 233. The event controller 231 may control an event, so that a normal code NM_CODE can be executed after a recovery code REC_CODE is performed. The error corrector 233 may determine whether error-containing data is error-correctable, and correct the error of the data.

In an embodiment, the event controller 231 may sense an event occurring while the operation mode of the storage device 50 is the sleep mode. The event occurring during the sleep mode of the storage device 50 may include Sudden Power Off (SPO) and/or a decrease in power consumption due to external noise. The event occurring in the state of the operation mode of the storage device 50 is the sleep mode may include various abnormal situations in addition to the above examples.

Also, the event controller 231 may perform an operation for correcting the error of the data by sensing the event. Further, when there is no data in which an error occurs or when the error correction of data is completed, the event controller 231 may output a normal code request NC_REQ.

In an embodiment, the event controller 231 may receive a recovery code REC_CODE stored in the recovery code storage 220 (①). The recovery code REC_COD may be a code for the recovery operation. The recovery code REC_CODE may be executed when the operation mode of the storage device 50 is converted from the sleep mode to the normal mode. When the recovery code REC_CODE is executed, an error correction operation may be performed.

The event controller 231 may execute the received recovery code REC_CODE. Specifically, the event controller 231 may output error occurrence data ERR_DATA to the error corrector 233 by executing the recovery code REC_CODE (②). The error occurrence data ERR_DATA may be code data and meta data stored in the memory controller 200 and in which an error occurs when the operation mode of the storage device 50 is the sleep mode. That is, when the operation mode of the storage device 50 is the sleep mode, the event controller 231 may output the error occurrence data ERR_DATA in which the error occurs by sensing the event.

The error corrector 233 may receive error occurrence data ERR_DATA from the event controller 231. The error corrector 233 may determine whether the error occurrence data ERR_DATA is error-correctable. That is, the recovery operation may include an operation of determining whether data is error-correctable. The data in which the error occurs may be correctable or uncorrectable, based on the number of error bits in the data. Error correction may be impossible when the number of error bits exceeds a correctable bit number.

In an embodiment, when the error correction of the error-containing data is possible, the error corrector 233 may perform an error correction operation. When the error correction operation is performed, the data may be error-corrected. The error corrector 233 may output error correction data ECC_DATA on which the error correction operation is performed to the event controller 231 (③).

When the event controller 231 receives the error correction data ECC_DATA from the error corrector 233, the event controller 231 may output a normal code request NC_REQ (④). The normal code request NC_REQ may be a request for acquiring a normal code NM_CODE stored in the normal code storage 240. Therefore, the normal code request NC_REQ may be a request for executing the normal code NM_CODE after the recovery code REC_CODE is executed. When a normal code NM_CODE corresponding to the normal code request NC_REQ is received, the code executer 230 may execute the normal code NM_CODE.

In another embodiment, when the error correction of the data is impossible, the error corrector 233 cannot perform the error correction operation. When the data in which the error occurs is not able to be corrected, an operation of the storage device 50 may be stopped.

Therefore, when the error-containing data is not error-corrected, the error corrector 233 may output the reset request RST_REQ (③). The reset request RST_REQ may be a request for resetting the storage device 50. Specifically, when the error corrector 233 outputs the reset request RST_REQ to the reset controller 250, the reset controller 250 may perform a reset operation corresponding to the reset request RST_REQ. The reset operation may be performed when the code executer 230 fails to error-correct the data stored in the memory controller 200 even by executing the recovery code REC_CODE.

Specifically, the reset operation may be determined based on the recovery operation performed when the operation mode of the storage device 50 is converted from the sleep mode to the normal mode. The reset operation may be performed when the code executer 230 fails to error-correct the data stored in the memory controller 200 even by executing the recovery code REC_CODE.

After the operation mode of the storage device 50 is the booting mode since the reset operation is performed, the storage device 50 may re-determine an operation mode, based on the power consumption.

Figure 7:
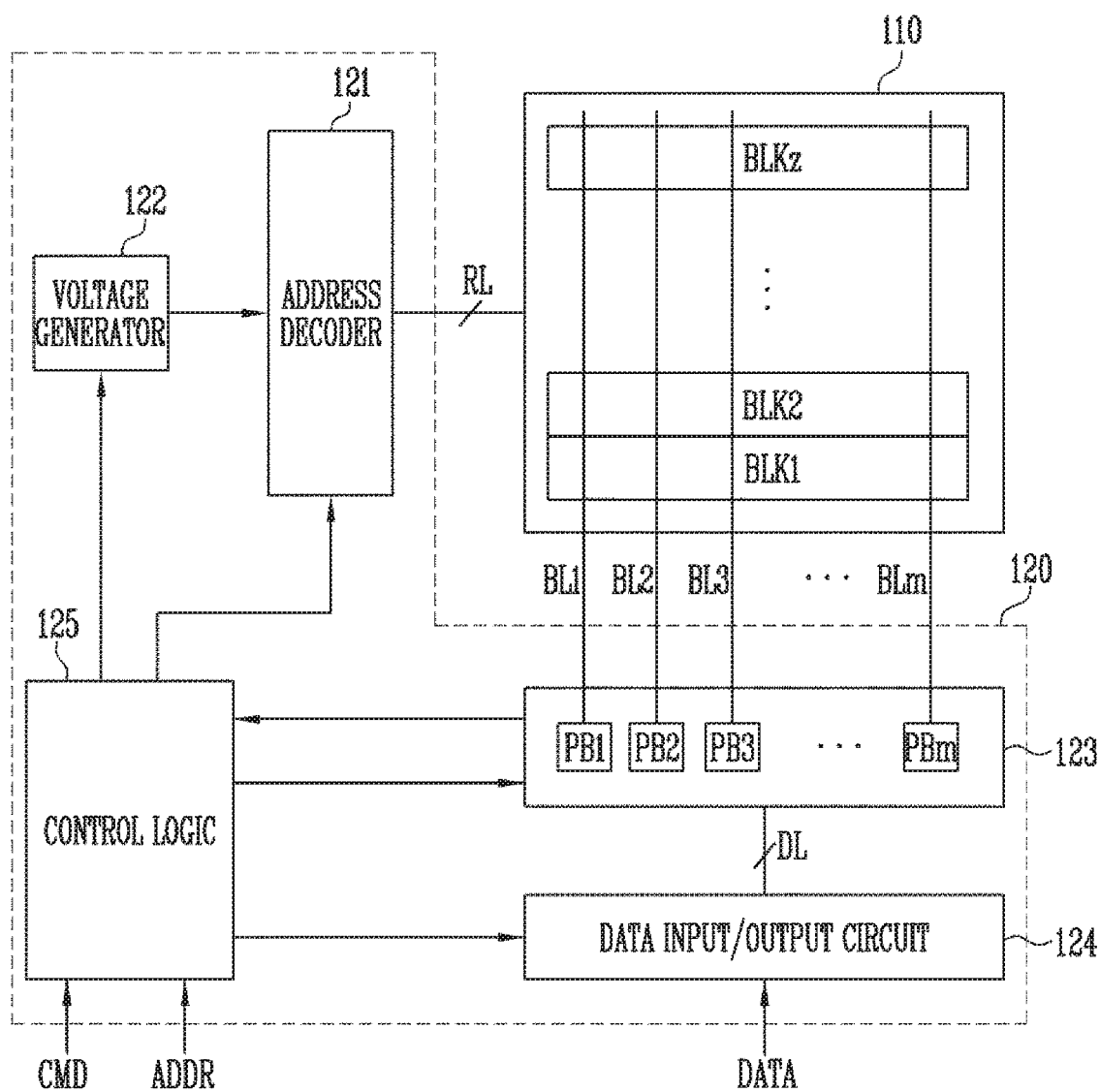
FIG. 7 is a block diagram illustrating a structure of a memory device, such as that shown in FIG. 1.

FIG. 7 is a block diagram illustrating a structure of the memory device shown in FIG. 1.

Referring to FIG. 7, the memory device 100 includes a memory cell array 110, a peripheral circuit 120, and control logic 125.

The memory cell array 110 may include a plurality of memory blocks BLK1 to BLKz. The plurality of memory blocks BLK1 to BLKz are coupled to an address decoder 121 through row lines RL, and are coupled to a read/write circuit 123 through bit lines BL1 to BLm. Each of the plurality of memory blocks BLK1 to BLKz includes a plurality of memory cells. In an embodiment, the plurality of memory cells are nonvolatile memory cells.

A plurality of memory cells included in the memory cell array may be divided into a plurality of blocks according to usage thereof. System information as various setting information necessary to control the memory device 100 may be stored in the plurality of blocks.

Each of first to zth memory blocks BLK1 to BLKz includes a plurality of cell strings. First to mth cell strings are coupled to first to mth bit lines BL1 to BLm, respectively. Each of the first to mth cell strings includes a drain select transistor, a plurality of memory cells coupled in series, and a source select transistor. The drain select transistor is coupled to a drain select line. First to nth memory cells are coupled to first to nth word lines. The source select transistor is coupled to a source select line. A drain side of the drain select transistor is coupled to a corresponding bit line. The drain select transistors of the first to mth cell strings are coupled to the first to mth bit lines BL1 to BLm, respectively. A source side of the source select transistor is coupled to a common source line. In an embodiment, the common source line may be commonly coupled to the first to zth memory blocks BLK1 to BLKz. The drain select line DSL, the first to nth word lines, and the source select line are included in the row lines RL. The drain select line DSL, the first to nth word lines, and the source select line are controlled by the address decoder 121. The common source line is controlled by the control logic 125. The first to mth bit lines BL1 to BLm are controlled by the read/write circuit 123.

The peripheral circuit 120 includes the address decoder 121, a voltage generator 122, the read/write circuit 123, a data input/output circuit 124, and the control logic 125.

The address decoder 121 is coupled to the memory cell array 110 through the row lines RL. The address decoder 121 is configured to operate under the control of the control logic 125. The address decoder 121 receives an address ADDR through the control logic 125.

In an embodiment, a program operation and a read operation of the memory device 100 are performed in units of pages.

In the program and read operations, the address ADDR received by the control logic 125 may include a block address and a row address. The address decoder 121 is configured to decode the block address in the received address ADDR. The address decoder 121 selects one memory block among the memory blocks BLK1 to BLKz according to the decoded block address.

The address decoder 121 is configured to decode the row address in the received address ADDR. The address decoder 121 selects one word line of a selected memory block by applying voltages provided from the voltage generator 122 to the row lines RL according to the decoded row address.

In an erase operation, the address ADDR includes a block address. The address decoder 121 decodes the block address, and selects one memory block according to the decoded block address. The erase operation may be performed on the whole or a portion of the one memory block.

In a partial erase operation, the address ADDR may include block and row addresses. The address decoder 121 selects one memory block among the memory blocks BLK1 to BLKz according to the block address.

The address decoder 121 is configured to decode the row addresses in the received address ADDR. The address decoder 121 selects at least one word line of the selected memory block by applying voltages provided from the voltage generator 122 to the row lines RL according to the decoded row addresses.

In an embodiment, the address decoder 121 may include a block decoder, a word line decoder, an address buffer, and the like.

The voltage generator 122 generates a plurality of voltages, using an external power voltage supplied to the memory device 100. The voltage generator 122 operates under the control of the control logic 125.

In an embodiment, the voltage generator 122 may generate an internal power voltage by regulating the external power voltage. The internal power voltage generated by the voltage generator 122 is used as an operating voltage of the memory device 100.

In an embodiment, the voltage generator 122 may generate a plurality of voltages, using the external power voltage or the internal power voltage.

For example, the voltage generator 122 may include a plurality of pumping capacitors for receiving the internal power voltage, and generate a plurality of voltages by selectively activating the plurality of pumping capacitors under the control of the control logic 130. The plurality of generated voltages are applied to word lines selected by the address decoder 121.

In a program operation, the voltage generator 122 may generate a high-voltage program pulse and a pass pulse lower than the program pulse. In a read operation, the voltage generator 122 may generate a read voltage and a pass voltage higher than the read voltage. In an erase operation, the voltage generator 122 may generate an erase voltage.

The read/write circuit 123 includes first to mth page buffers PB1 to PBm. The first to mth page buffers PB1 to PBm are coupled to the memory cell array 110 respectively through the first to mth bit lines BL1 to BLm. The first to mth page buffers PB1 to PBm operate under to control of the control logic 125.

The first to mth page buffers PB1 to PBm communicate data with the data input/output circuit 124. In a program operation, the first to mth page buffers PB1 to PBm receive data DATA to be stored through the data input/output circuit 124 and data lines DL.

In a program operation, when a program pulse is applied to a selected word line, the first to mth page buffers PB1 to PBm may transfer the data DATA received through the data input/out circuit 124 to selected memory cells through the bit lines BL1 to BLm. Memory cells of a selected page are programmed according to the transferred data DATA. A memory cell coupled to a bit line to which a program allow voltage (e.g., a ground voltage) is applied may have an increased threshold voltage. A threshold voltage of a memory cell coupled to a bit line to which a program inhibit voltage (e.g., a power voltage) may be maintained. In a program verify operation, the first to mth page buffers PB1 to PBm read page data from selected memory cells through the bit lines BL1 to BLm.

In a read operation, the read/write circuit 123 reads data DATA from memory cells of a selected page through the bit lines BL, and outputs the read data DATA to the data input/output circuit 124. In an erase operation, the read/write circuit 123 may float the bit lines BL.

In an embodiment, the read/write circuit 123 may include a column select circuit.

The data input/output circuit 124 is coupled to the first to mth page buffers PB1 to PBm through the data lines DL. The data input/output circuit 124 operates under the control of the control logic 125. In a program operation, the data input/output circuit 124 receives data DATA to be stored from an external controller (not shown).

The control logic 125 is coupled to the address decoder 121, the voltage generator 122, the read/write circuit 123, and the data input/output circuit 124. The control logic 125 may control overall operations of the memory device 100. The control logic 125 receives a command CMD and an address ADDR. The control logic 125 controls the address decoder 121, the voltage generator 122, the read/write circuit 123, and the data input/output circuit 124 in response to the command CMD.

Figure 8:
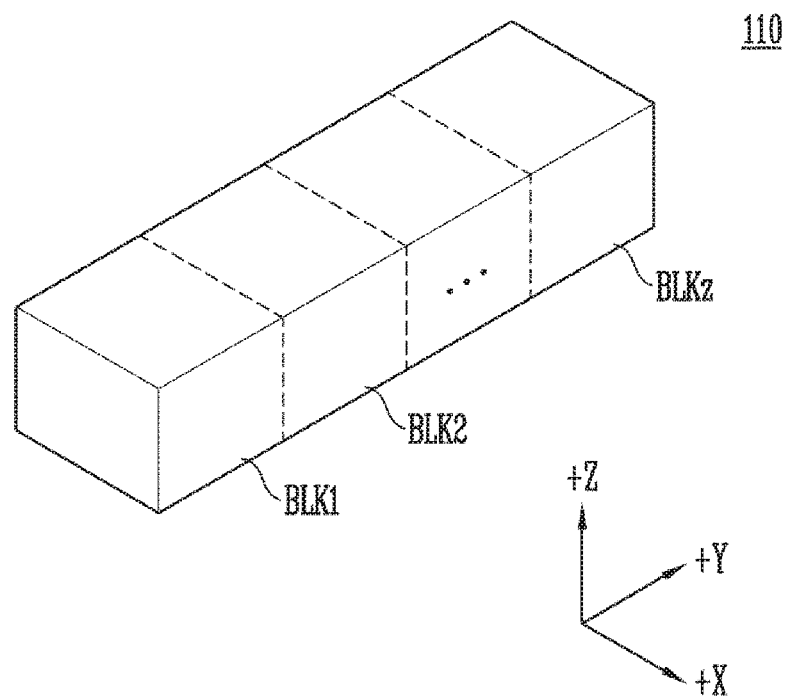
FIG. 8 is a diagram illustrating an embodiment of a memory cell array, such as that shown in FIG. 7.

FIG. 8 is a diagram illustrating an embodiment of the memory cell array shown in FIG. 7.

Referring to FIG. 8, the memory cell array 110 may include a plurality of memory blocks BLK1 to BLKz. Each memory block may have a three-dimensional structure. Each memory block may include a plurality of memory cells stacked on a substrate (not shown). The plurality of memory cells may be arranged along +X, +Y, and +Z directions. A structure of each memory block will be described in more detail with reference to FIGS. 9 and 10.

Figure 9:
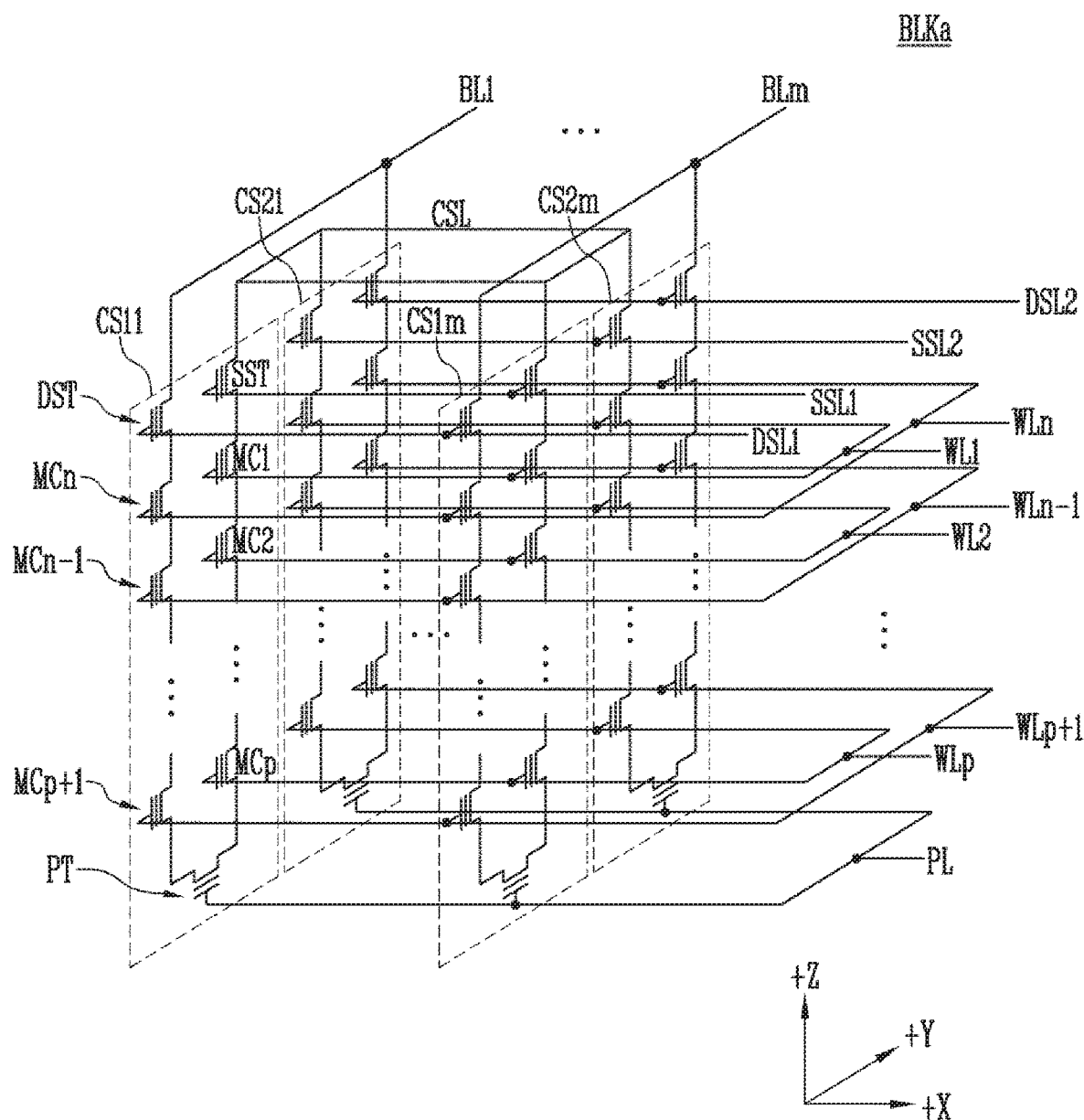
FIG. 9 is a circuit diagram illustrating a representative memory block among memory blocks shown in FIG. 8.

FIG. 9 is a circuit diagram illustrating any one memory block BLKa among the memory blocks BLK1 to BLKz shown in FIG. 8.

Referring to FIG. 9, the memory block BLKa may include a plurality of cell strings CS11 to CS1m and CS21 to CS2m. In an embodiment, each of the plurality of cell strings CS11 to CS1m and CS21 to CS2m may be formed in a 'U' shape. In the memory block BLKa, m cell strings are arranged in a row direction (i.e., a +X direction). FIG. 9 illustrates two cell strings arranged in a column direction (i.e., a +Y direction). However, this is for clarity; it will be understood that three cell strings may be arranged in the column direction.

Each of the plurality of cell strings CS11 to CS1m and CS21 to CS2m may include at least one source select transistor SST, first to nth memory cells MC1 to MCn, a pipe transistor PT, and at least one drain select transistor DST.

The select transistors SST and DST and the memory cells MC1 to MCn may have structures similar to one another. In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided in each cell string. In an embodiment, a pillar for providing at least one of the channel layer, the tunneling insulating layer, the charge storage layer, and the blocking insulating layer may be provided in each cell string.

The source select transistor SST of each cell string is coupled between a common source line CSL and memory cells MC1 to MCp.

In an embodiment, the source select transistors of cell strings arranged on the same row are coupled to a source select line extending in the row direction, and the source select transistors of cell strings arranged on different rows are coupled to different source select lines. In FIG. 9, the source select transistors of the cell strings CS11 to CS1m on a first row are coupled to a first source select line SSL1. The source select transistors of the cell strings CS21 to CS2m on a second row are coupled to a second source select line SSL2.

In another embodiment, the source select transistors of the cell strings CS11 to CS1m and CS21 to CS2m may be commonly coupled to one source select line.

The first to nth memory cells MC1 to MCn of each cell string are coupled between the source select transistor SST and the drain select transistor DST.

The first to nth memory cells MC1 to MCn may be divided into first to pth memory cells MC1 to MCp and a (p+1)th to nth memory cells MCp+1 to MCn. The first to pth memory cells MC1 to MCp are sequentially arranged in the opposite direction of a +Z direction, and are coupled in series between the source select transistor SST and the pipe transistor PT. The (p+1)th to nth memory cells MCp+1 to MCn are sequentially arranged in the +Z direction, and are coupled in series between the pipe transistor PT and the drain select transistor DST. The first to pth memory cells MC1 to MCp and the (p+1)th to nth memory cells MCp+1 to MCn are coupled through the pipe transistor PT. Gate electrodes of the first to nth memory cells MC1 to MCn of each cell string are coupled to first to nth word lines WL1 to WLn, respectively.

A gate of the pipe transistor PT of each cell string is coupled to a pipe line PL.

The drain select transistor DST of each cell string is coupled between a corresponding bit line and the memory cells MCp+1 to MCn. Cell strings arranged in the row direction are coupled to a drain select line extending in the row direction. The drain select transistors of the cell strings CS11 to CS1m on the first row are coupled to a first drain select line DSL1. The drain select transistors of the cell strings CS21 to CS2m on the second row are coupled to a second drain select line DSL2.

Cell strings arranged in the column direction are coupled to a bit line extending in the column direction. In FIG. 9, the cell strings CS11 and CS21 on a first column are coupled to a first bit line BL1. The cell strings CS1m and CS2m on an mth column are coupled to an mth bit line BLm.

Memory cells coupled to the same word line in the cell strings arranged in the row direction constitute one page. For example, memory cells coupled to the first word line WL1 in the cell strings CS11 to CS1m on the first row constitute one page. Memory cells coupled to the first word line WL1 in the cell strings CS21 to CS2m on the second row constitute another page. As any one of the drain select lines DSL1 and DSL2 is selected, cell strings arranged in one row direction may be selected. As any one of the word lines WL1 to WLn is selected, one page may be selected in the selected cell strings.

In another embodiment, even bit lines and odd bit lines may be provided instead of the first to mth bit lines BL1 to BLm. In addition, even-numbered cell strings among the cell strings CS11 to CS1m or CS21 to CS2m arranged in the row direction may be coupled to the even bit lines, respectively, and odd-numbered cell strings among the cell strings CS11 to CS1m or CS21 to CS2m arranged in the row direction may be coupled to the odd bit lines, respectively.

In an embodiment, at least one of the first to nth memory cells MC1 to MCn may be used as a dummy memory cell. For example, the dummy memory cell(s) may be provided to decrease an electric field between the source select transistor SST and the memory cells MC1 to MCp. Alternatively, the dummy memory cell(s) may be provided to decrease an electric field between the drain select transistor DST and the memory cells MCp+1 to MCn. When the number of dummy memory cells increases, the reliability of an operation of the memory block BLKa is improved. On the other hand, the size of the memory block BLKa increases. When the number of dummy memory cells decreases, the size of the memory block BLKa decreases. On the other hand, the reliability of an operation of the memory block BLKa may be deteriorated.

In order to efficiently control the dummy memory cell(s), each of the dummy memory cells may have a required threshold voltage. Before or after an erase operation of the memory block BLKa, a program operation may be performed on all or some of the dummy memory cells. When an erase operation is performed after the program operation is performed, the threshold voltage of the dummy memory cells control a voltage applied to the dummy word lines coupled to the respective dummy memory cells, so that the dummy memory cells can have the required threshold voltage.

Figure 10:
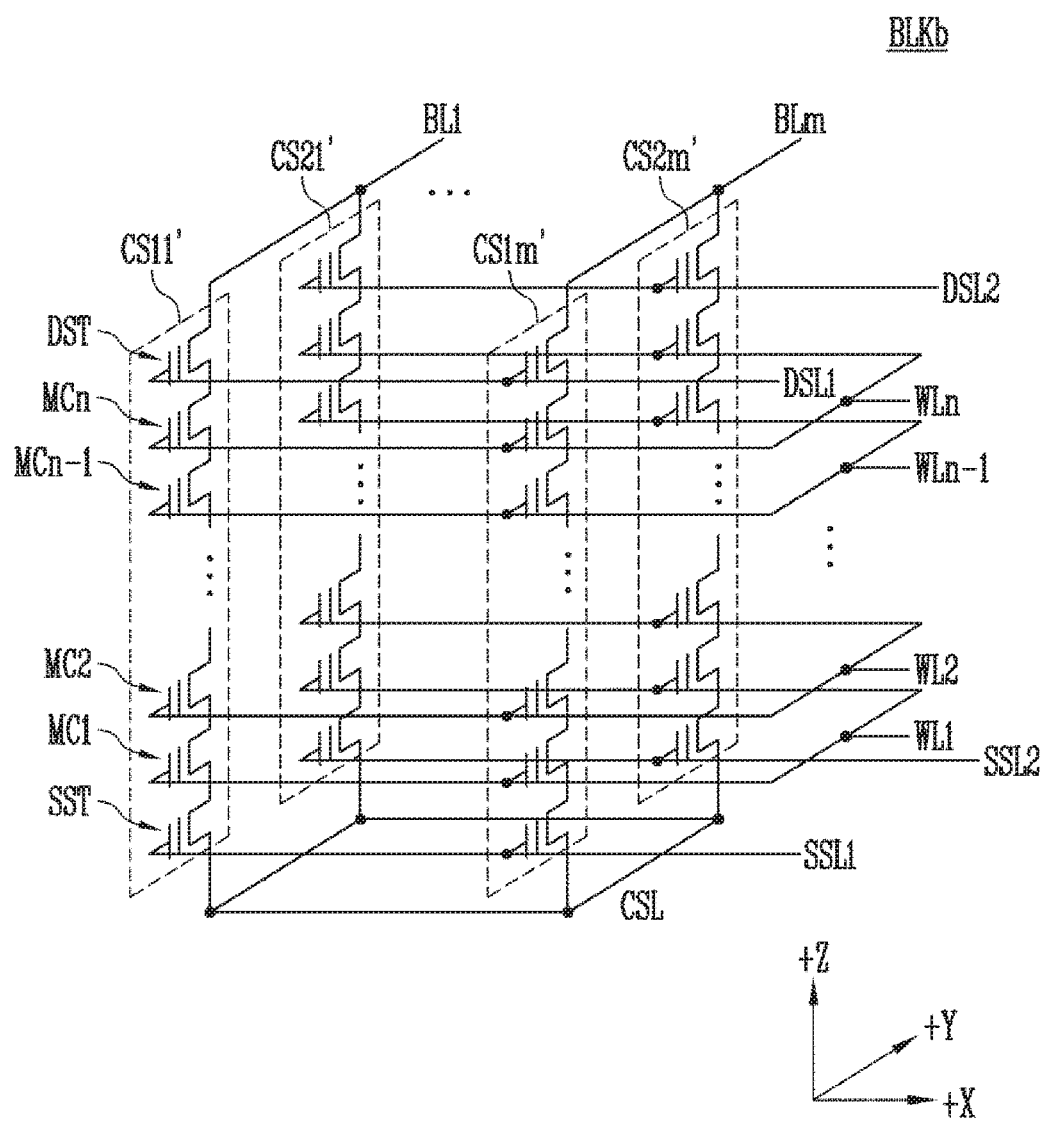
FIG. 10 is a circuit diagram illustrating another embodiment of a representative memory block among the memory blocks shown in FIG. 8.

FIG. 10 is a circuit diagram illustrating another embodiment BLKb of the one memory block among the memory blocks BLK1 to BLKz shown in FIG. 8.

Referring to FIG. 10, the memory block BLKb may include a plurality of cell strings CS11' to CS1m' and CS21' to CS2m'. Each of the plurality of cell strings CS11' to CS1m' and CS21' to CS2m' extends along the +Z direction. Each of the plurality of cell strings CS11' to CS1m' and CS21' to CS2m' includes at least one source select transistor SST, first to nth memory cells MC1 to MCn, and at least one drain select transistor DST, which are stacked on a substrate (not shown) under the memory block BLKb.

The source select transistor SST of each cell string is coupled between a common source line CSL and the memory cells MC1 to MCn. The source select transistors of cell strings arranged on the same row are coupled to the same source select line. The source select transistors of the cell strings CS11' to CS1m' arranged on a first row are coupled to a first source select line SSL1. Source select transistors of the cell strings CS21' to CS2m' arranged on a second row are coupled to a second source select line SSL2. In another embodiment, the source select transistors of the cell strings CS11' to CS1m' and CS21' to CS2m' may be commonly coupled to one source select line.

The first to nth memory cells MC1 to MCn of each cell string are coupled in series between the source select transistor SST and the drain select transistor DST. Gate electrodes of the first to nth memory cells MC1 to MCn are coupled to first to nth word lines WL1 to WLn, respectively.

The drain select transistor DST of each cell string is coupled between a corresponding bit line and the memory cells MC1 to MCn. The drain select transistors of cell strings arranged in the row direction are coupled to a drain select line extending in the row direction. The drain select transistors of the cell strings CS11' to CS1m' on the first row are coupled to a first drain select line DSL1. The drain select transistors of the cell strings CS21' to CS2m' on the second row are coupled to a second drain select line DSL2.

Consequently, the memory block BLKb of FIG. 10 has a circuit similar to that of the memory block BLKa of FIG. 9, except that the pipe transistor PT is excluded from each cell string in FIG. 10.

In another embodiment, even bit lines and odd bit lines may be provided instead of the first to mth bit lines BL1 to BLm. In addition, even-numbered cell strings among the cell strings CS11' to CS1m' or CS21' to CS2m' arranged in the row direction may be coupled to the even bit lines, respectively, and odd-numbered cell strings among the cell strings CS11' to CS1m' or CS21' to CS2m' arranged in the row direction may be coupled to the odd bit lines, respectively.

In an embodiment, at least one of the first to nth memory cells MC1 to MCn may be used as a dummy memory cell. For example, the dummy memory cell(s) may be provided to decrease an electric field between the source select transistor SST and the memory cells MC1 to MCp. Alternatively, the dummy memory cell(s) may be provided to decrease an electric field between the drain select transistor DST and the memory cells MCp+1 to MCn. When the number of dummy memory cells increases, the reliability of an operation of the memory block BLKb is improved. On the other hand, the size of the memory block BLKb is increased. When the number of dummy memory cells decreases, the size of the memory block BLKb decreases. On the other hand, the reliability of an operation of the memory block BLKb may be deteriorated.

In order to efficiently control the dummy memory cell(s), each of the dummy memory cells may have a required threshold voltage. Before or after an erase operation of the memory block BLKb, a program operation may be performed on all or some of the dummy memory cells. When an erase operation is performed after the program operation is performed, the threshold voltage of the dummy memory cells control a voltage applied to the dummy word lines coupled to the respective dummy memory cells, so that the dummy memory cells can have the required threshold voltage.

Figure 11:
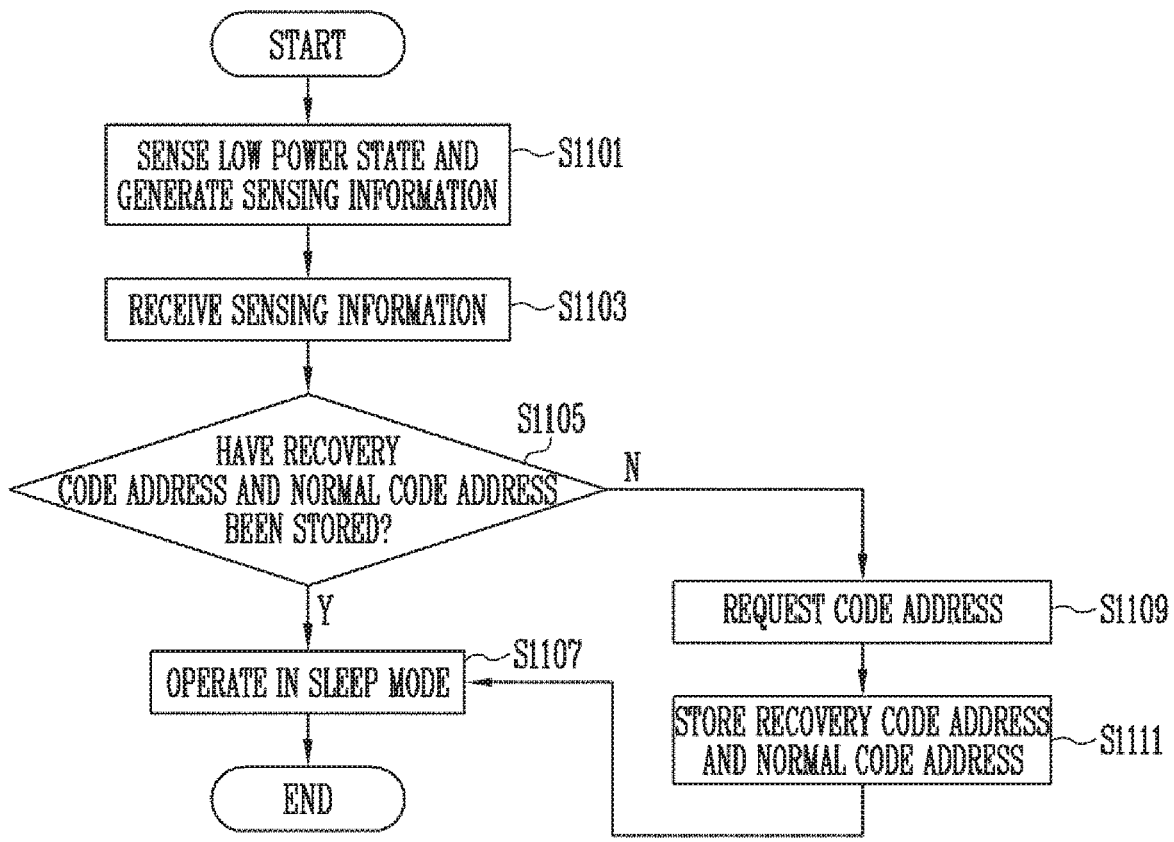
FIG. 11 is a diagram illustrating an operation of a memory controller in accordance with an embodiment of the present disclosure.

FIG. 11 is a diagram illustrating an operation of the memory controller in accordance with an embodiment of the present disclosure.

Referring to FIG. 11, in step S1101, the memory controller 200 may sense a low power state, and generate sensing information. The sensing information may be power sensing information including information on power consumption of the storage device 50. The low power state may be a state in which the power consumption of the storage device 50 is less than or equal to a reference consumption.

Before the low power state is sensed, the power consumption of the storage device 50 may exceed the reference consumption. Therefore, an operation mode of the storage device 50 may be the normal mode. Consequently, the step S1101 represents a case where the memory controller 200 senses that the storage device 50 has entered the low power state from the normal mode.

The memory controller 200 may include a power sensor configured to sense power consumption of the storage device and generate sensing information. Specifically, the power consumption of the storage device 50 may change over time. Therefore, as the power consumption of the storage device 50 decreases, the memory controller 200 may sense that the storage device 50 has entered into a decreased power consumption state, i.e., the low power state, and generate sensing information representing the low power state.

In step S1103, the mode converter 210 may receive sensing information. The sensing information may represent power consumption of the storage device 50. The mode converter 210 may determine an operation mode of the storage device 50 to be the normal mode or the sleep mode, based on the sensing information. The normal mode may be an operation mode of the storage device 50 when the power consumption exceeds the reference consumption. The sleep mode may be an operation mode of the storage device 50 when the power consumption of the storage device 50 is low. Since the step S1101 represents the case where the low power state is sensed just after the operation mode of the storage device 50 exits the normal mode, the mode converter 210 may determine that the operation mode of the storage device 50 converted from the normal mode to the sleep mode.

In step S1105, it may be determined whether a recovery code address RC_ADDR and a normal code address NC_ADDR have been stored in the nonvolatile memory of the mode converter 210. The recovery code address RC_ADDR may indicate a position at which a recovery code REC_CODE is stored within the recovery code storage 220. The normal code address NC_ADDR may indicate a position at which a normal code NM_CODE is stored within the normal code storage 240. The recovery code address RC_ADDR and the normal code address NC_ADDR may also be stored respectively in the recovery code storage 220 and the normal code storage 240, and provided to the nonvolatile memory of the mode converter 210.

The mode converter 210 may store the recovery code address RC_ADDR, when the operation mode of the storage device 50 is converted from the normal mode to the sleep mode. Therefore, when the operation mode of the storage device 50 is re-converted from the sleep mode to the normal mode, the received recovery code REC_CODE is executed based on the recovery code address RC_ADDR for the recovery operation.

When the recovery code address and the normal code address are stored in the mode converter 210, the operation proceeds to step S1107. When the recovery code address and the normal code address are not stored in the mode converter 210, the operation proceeds to step S1109.

In the step S1107, the storage device 50 may operate in the sleep mode. Specifically, when the power consumption of the storage device 50 is less than or equal to the reference consumption, the storage device 50 may operate in the sleep mode. When the operation mode of the storage device 50 is the sleep mode, the storage device 50 may perform first operations. The first operations may include minimal operations for operating the storage device 50. The minimal operations for operating the storage device 50 may be operations for maintaining a power-on state of the storage device 50.

In the step S1109, the mode converter 210 may request the recovery code storage 220 of a code address. The code address request may be a request for acquiring a recovery code address RC_ADDR. Specifically, the mode converter 210 may output a code address request CA_REQ to the recovery code storage 220. That is, when the operation mode of the storage device 50 is converted from the normal mode to the sleep mode, the mode converter 210 may output the code address request CA_REQ.

In an embodiment, the mode converter 210 may request the normal code storage 240 of a code address. The code address request may be a request for acquiring a normal code address NC_ADDR. The mode converter 210 may receive a normal code address NC_ADDR from the memory device 100, when the storage device 50 is initialized. However, when the mode converter 210 does not receive the normal code address NC_ADDR due to an abnormal operation of the storage device 50, the mode converter 210 may output a request for acquiring a normal code address.

In step S1111, the mode converter 210 may store a recovery code address RC_ADDR and a normal code address NC_ADDR. The recovery code address RC_ADDR and the normal code address NC_ADDR may be stored in the nonvolatile memory included in the mode converter 210. When the recovery code address RC_ADDR and the normal code address NC_ADDR are stored in the mode converter 210, the storage device 50 may operate in the sleep mode.

Figure 12:
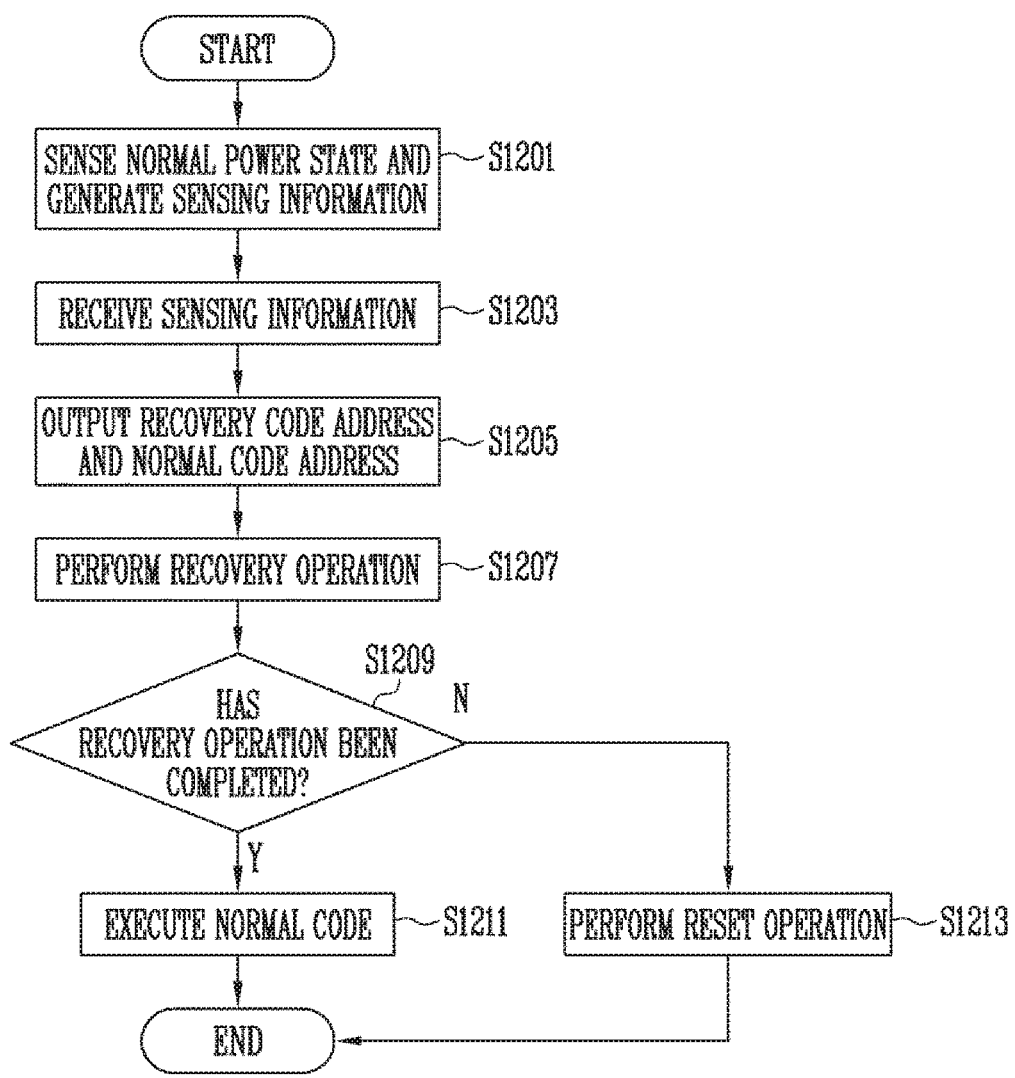
FIG. 12 is a diagram illustrating an operation of the memory controller in accordance with an embodiment of the present disclosure.

FIG. 12 is a diagram illustrating an operation of the memory controller in accordance with an embodiment of the present disclosure.

Referring to FIG. 12, in step S1201, the memory controller 200 may sense a normal power state, and generate sensing information. The sensing information may be power sensing information including information on a power consumption of the storage device 50. The normal power state may be a state of the storage device 50 when the power consumption of the storage device 50 exceeds a reference consumption.

Before the normal power state is sensed, the power consumption of the storage device 50 may be less than or equal to the reference consumption. Therefore, an operation mode of the storage device 50 may be the sleep mode. Consequently, the step S1201 represents a case where the storage device 50 just exited the sleep mode and the memory controller 200 senses that the storage device 50 is now in the normal mode.

In step S1203, the mode converter 210 may receive sensing information. The sensing information may be information representing a power consumption of the storage device 50. The mode converter 210 may determine the normal mode or the sleep mode to be the operation mode of the storage device 50, based on the sensing information. In step S1201, the mode converter 210 may determine that the operation mode of the storage device is converted from the sleep mode to the normal mode.

In step S1205, the mode converter 210 may output a normal code address NC_ADDR and a recovery code address RC_ADDR. Specifically, when the operation mode of the storage device 50 is converted from the sleep mode to the normal mode, the mode converter 210 may output the normal code address NC_ADDR and the recovery code address RC_ADDR.

The normal code address NC_ADDR may represent a position at which a normal code NM_CODE is stored within the normal code storage 240, and the recovery code address RC_ADDR may represent a position at which a recovery code REC_CODE is stored within the recovery code storage 220. The normal code address NC_ADDR may be received from the memory device 100 when the storage device 50 is initialized to be stored in the mode converter 210. The recovery code address RC_ADDR may be stored in the mode converter 210 when the storage device 50 is produced or when the operation mode of the storage device 50 is converted from the normal mode to the sleep mode.

In step S1207, the code executer 230 may perform a recovery operation. Specifically, the code executer 230 may receive a normal code address NC_ADDR and a recovery code address RC_ADDR from the mode converter 210. The code executer 230 may perform an operation by executing the normal code NM_CODE indicated by the normal code address NC_ADDR and the recovery code REC_CODE indicated by the recovery code address RC_ADDR when the operation mode of the storage device 50 is converted from the sleep mode to the normal mode.

In an embodiment, the code executer 230 may execute a recovery code REC_CODE by acquiring a recovery code REC_CODE corresponding to the recovery code address RC_ADDR. The code executer 230 may perform a recovery operation by executing the recovery code REC_CODE. The recovery operation may include an error correction operation of error-correcting data.

In step S1209, it may be determined whether the recovery operation performed by the code executer 230 has been completed. Specifically, when error correction of error occurrence data ERR_DATA is possible, and an error of the error occurrence data ERR_DATA is corrected, the recovery operation may be completed. However, when the error correction of the error occurrence data ERR_DATA is impossible, the recovery operation cannot be completed. When the recovery operation is completed, the operation proceeds to step S1211. When the recovery operation is not completed, the operation proceeds to step S1213.

In the step S1211, the code executer 230 may execute a normal code NM_CODE. In an embodiment, after the code executer 230 executes the recovery code REC_CODE, the code executer 230 may execute the normal code NM_CODE. The normal code NM_CODE may be a code executed such that the storage 50 operates in the normal mode. That is, the normal code NM_CODE may be a code for performing a background operation before the storage device 50 operates in the normal mode.

In the step S1213, the reset controller 250 may perform a reset operation. Specifically, when error correction of data is impossible, the code executer 230 may output a reset request RST_REQ for resetting the storage device 50 to the reset controller 250. The reset controller 250 may control the storage device 50 to operate in the booting mode by receiving the reset request RST_REQ.

That is, since the recovery operation cannot be completed by performing the recovery code REC_CODE, the reset controller 250 may control the storage device 50 to operate in the booting mode.

Figure 13:
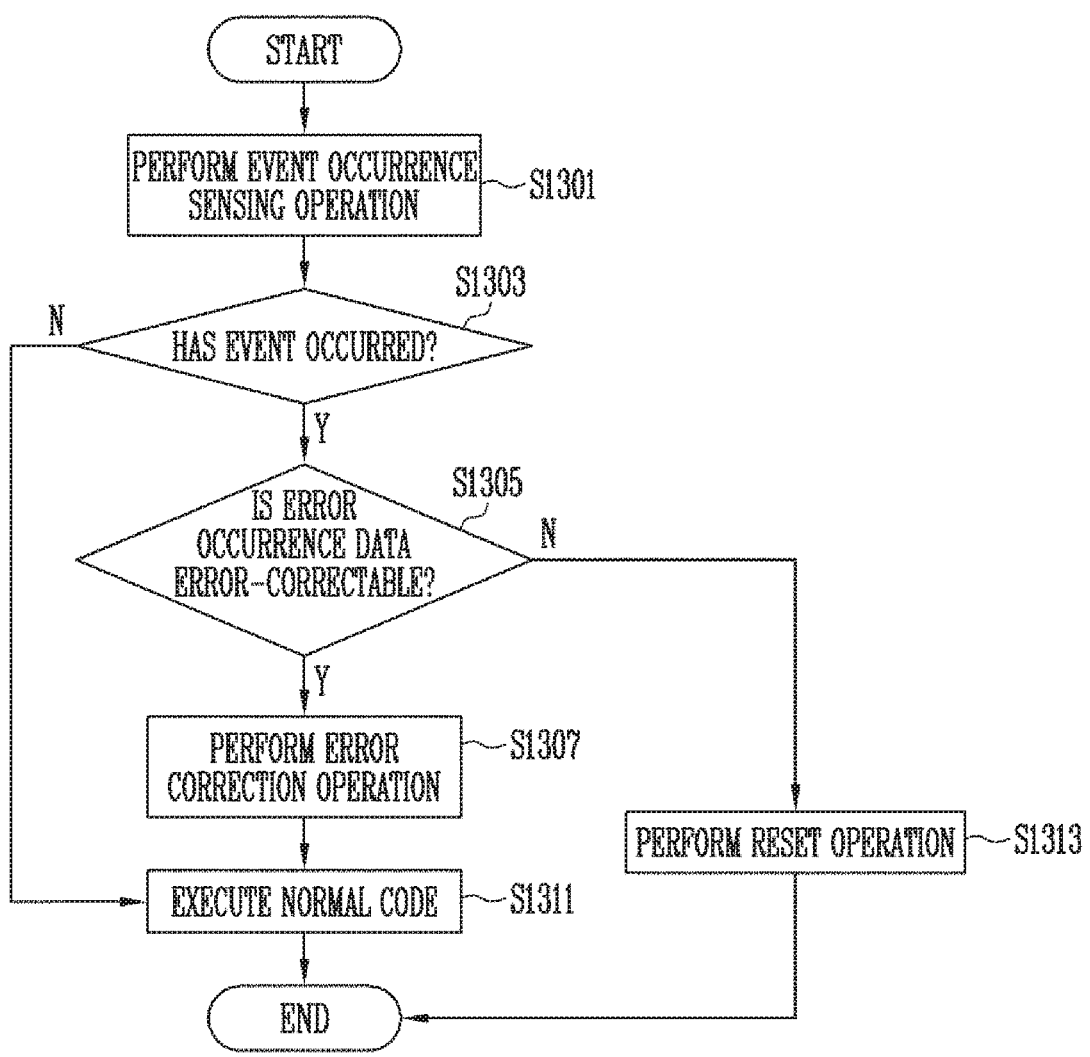
FIG. 13 is a diagram illustrating an operation of the memory controller in accordance with an embodiment of the present disclosure.

FIG. 13 is a diagram illustrating an operation of the memory controller in accordance with an embodiment of the present disclosure.

Referring to FIGS. 12 and 13, FIG. 13 is a flowchart illustrating in more detail the steps S1207 to S1213 shown in FIG. 12. That is, FIG. 13 is a flowchart illustrating in more detail the recovery operation in the step S1207.

In step S1301, the event controller 231 may perform an event occurrence sensing operation of sensing occurrence of an event. Specifically, the event controller 231 may sense an event occurring while the storage device 50 is in the sleep mode. Such event may include any of a Sudden Power Off (SPO) and a decrease in power consumption due to external noise. The event occurring while the storage device 50 is in the sleep mode may include various other abnormal situations in addition to the above examples.

In step S1303, the event controller 231 may determine whether an event has occurred. Specifically, the event controller 231 may determine whether an event has occurred while the storage device 50 is in the sleep mode. When an event is determined to have occurred, the operation proceeds to step S1305. When no event occurs, the operation proceeds to step S1311.

In the step S1305, the error corrector 233 may determine whether error occurrence data ERR_DATA is error-correctable. Error occurrence data ERR_DATA that is uncorrectable may have a number of error bits that exceeds a correctable bit number.

Specifically, when the event controller 231 senses an event, the event controller 231 may output error occurrence data ERR_DATA occurring due to the event to the error corrector 233. The error corrector 233 may determine whether the received error occurrence data ERR_DATA is error-correctable. When the error occurrence data ERR_DATA is error-correctable, the operation proceeds to step S1307. When the error occurrence data ERR_DATA is uncorrectable, the operation proceeds to step S1313. Data that is uncorrectable have a number of error bits that exceeds a correctable bit number.

In the step S1307, the error corrector 233 may perform an error correction operation. That is, when the error occurrence data ERR_DATA is error-correctable, the error corrector 233 may perform the error correction operation. When the error correction operation is performed, the error occurrence data ERR_DATA may be error-corrected.

In the step S1311, the code executer 230 may execute a normal code NM_CODE. In an embodiment, the code executer 230 may execute the normal code NM_CODE after a recovery code REC_CODE is executed.

When occurrence of an event is not sensed while the storage device 50 is in the sleep mode, the code executer 230 may omit the error correction operation, and immediately execute the normal code NM_CODE. However, when occurrence of an event is sensed while the storage device 50 is in the sleep mode, the code executer 230 may execute the normal code NM_CODE after the error correction operation is performed.

In the step S1313, the reset controller 250 may perform a reset operation. Specifically, when error correction of the error occurrence data ERR_DATA is impossible, the code executer 230 may output a reset request RST_REQ for resetting the storage device 50 to the reset controller 250. The reset controller 250 may control the storage device 50 to operate in the booting mode by receiving the reset request RST_REQ.

That is, since a recovery operation cannot be completed by performing the recovery code REC_CODE, the reset controller 250 may control the storage device 50 to operate in the booting mode.

Figure 14:
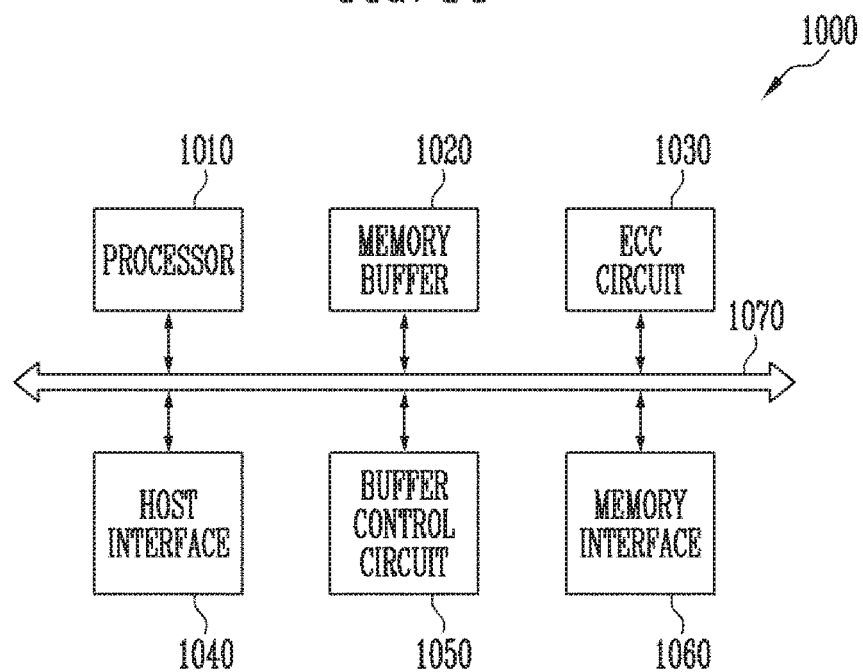
FIG. 14 is a diagram illustrating another embodiment of the memory controller shown in FIG. 1.

FIG. 14 is a diagram illustrating another embodiment of the memory controller shown in FIG. 1.

Referring to FIG. 14, a memory controller 1000 is coupled to a host and a memory device. The memory controller 1000 is configured to access the memory device in response to a request received from the host. For example, the memory controller 1000 is configured to control read, program, erase, and background operations of the memory device. The memory controller 1000 is configured to provide an interface between the memory device and the host. The memory controller 1000 is configured to drive firmware for controlling the memory device.

The memory controller 1000 may include a processor 1010, a memory buffer 1020, an error correction code (ECC) circuit 1030, a host interface 1040, a buffer control circuit 1050, a memory interface 1060, and a bus 1070.

The bus 1070 may be configured to provide channels between components of the memory controller 1000.

The processor 1010 may control overall operations of the memory controller 1000, and perform a logical operation. The processor 1010 may communicate with the external host through the host interface 1040, and communicate with the memory device through the memory interface 1060. Also, the processor 1010 may communicate with the memory buffer 1020 through the buffer control circuit 1050. The processor 1010 may control an operation of the storage device, using the memory buffer 1020 as a working memory, a cache memory or a buffer memory.

The processor 1010 may perform a function of a flash translation layer (FTL). The processor 1010 may translate a logical block address (LBA) provided by the host through the FTL into a physical block address (PBA). The FTL may receive an LPA, using a mapping table, to be translated into a PBA. Several address mapping methods of the FTL exist according to mapping units. A representative address mapping method includes a page mapping method, a block mapping method, and a hybrid mapping method.

The processor 1010 is configured to randomize data received from the host. For example, the processor 1010 may randomize data received from the host, using a randomizing seed. The randomized data is provided as data to be stored to the memory device to be programmed in the memory cell array.

In a read operation, the processor 1010 is configured to derandomize data received from the memory device. For example, the processor 1010 may derandomize data received from the memory device, using a derandomizing seed. The derandomized data may be output to the host.

In an embodiment, the processor 1010 may perform randomizing and derandomizing by driving software or firmware.

The memory buffer 1020 may be used as the working memory, the cache memory, or the buffer memory of the processor 1010. The memory buffer 1020 may store codes and commands, which are executed by the processor 1010. The memory buffer 1020 may include a Static RAM (SRAM) or a Dynamic RAM (DRAM).

The ECC circuit 1030 may perform an ECC operation. The ECC circuit 1030 may perform ECC encoding on data to be written in the memory device through the memory interface 1060. The ECC encoded data may be transferred to the memory device through the memory interface 1060. The ECC circuit 1030 may perform ECC decoding on data received from the memory device through the memory interface 1060. In an example, the ECC circuit 1030 may be included as a component of the memory interface 1060 in the memory interface 1060.

The host interface 1040 may communicate with the external host under the control of the processor 1010. The host interface 1040 may communicate with the host, using at least one of various communication protocols, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a nonvolatile memory express (NVMe), a Universal Flash Storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

The buffer control circuit 1050 is configured to control the memory buffer 1020 under the control of the processor 1010.

The memory interface 1060 is configured to communicate with the memory device under the control of the processor 1010. The memory interface 1060 may communicate a command, an address, and data with the memory device through a channel.

In an example, the memory controller 1000 may not include the memory buffer 1020 and the buffer control circuit 1050. Either or both of these buffer components may be provided separately, or one or both of their functions may be distributed to other components of the memory controller 1000.

In an example, the processor 1010 may control an operation of the memory controller 1000 by using codes. The processor 1010 may load codes from a nonvolatile memory device (e.g., a read only memory (ROM)) provided in the memory controller 1000. In another example, the processor 1010 may load codes from the memory device through the memory interface 1060.

In an example, the bus 1070 of the memory controller 1000 may be divided into a control bus and a data bus. The data bus may be configured to transmit data in the memory controller 1000, and the control bus may be configured to transmit control information such as a command and an address in the memory controller 1000. The data bus and the control bus are separated from each other, and may not interfere or influence with each other. The data bus may be coupled to the host interface 1040, the buffer control circuit 1050, the ECC circuit 1030, and the memory interface 1060. The control bus may be coupled to the host interface 1040, the processor 1010, the buffer control circuit 1050, the memory buffer 1020, and the memory interface 1060.

Figure 15:
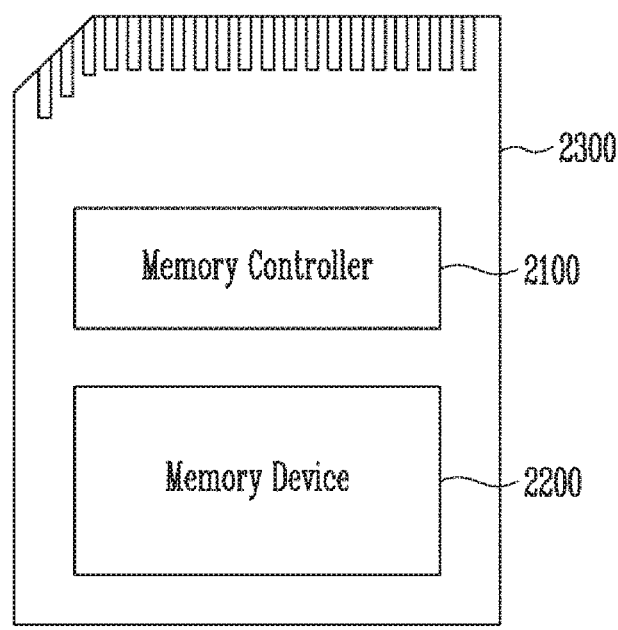
FIG. 15 is a block diagram illustrating a memory card system to which the storage device is applied in accordance with an embodiment of the present disclosure.

FIG. 15 is a block diagram illustrating a memory card system to which the storage device is applied in accordance with an embodiment of the present disclosure.

Referring to FIG. 15, the memory card system 2000 includes a memory controller 2100, a memory device, and a connector 2300.

The memory controller 2100 is coupled to the memory device 2200. The memory controller 2100 is configured to access the memory device 2200. For example, the memory controller 2100 is configured to control read, write, erase, and background operations of the memory device 2200. The memory controller 2100 is configured to provide an interface between the memory device 2200 and a host. The memory controller 2100 is configured to driver firmware for controlling the memory device 2200. The memory device 2200 may be implemented identically to the memory device 100 described with reference to FIG. 7.

In an example, the memory controller 2100 may include components such as a Random Access Memory (RAM), a processing unit, a host interface, a memory interface, and the error corrector 233.

The memory controller 2100 may communicate with an external device through the connector 2300. The memory controller 2100 may communicate with the external device (e.g., the host) according to a specific communication protocol. In an example, the memory controller 2100 may communicate with the external device through at least one of various communication protocols, such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and NVMe.

In an example, the memory device 2200 may be implemented with any of various nonvolatile memory devices, such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and a Spin Torque Transfer magnetic RAM (STT-MRAM).

The memory controller 2100 and the memory device 2200 may be integrated into a single semiconductor device, to constitute a memory card. For example, the memory controller 2100 and the memory device 2200 may constitute a memory card such as a PC card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and a Universal Flash Storage (UFS).

Figure 16:
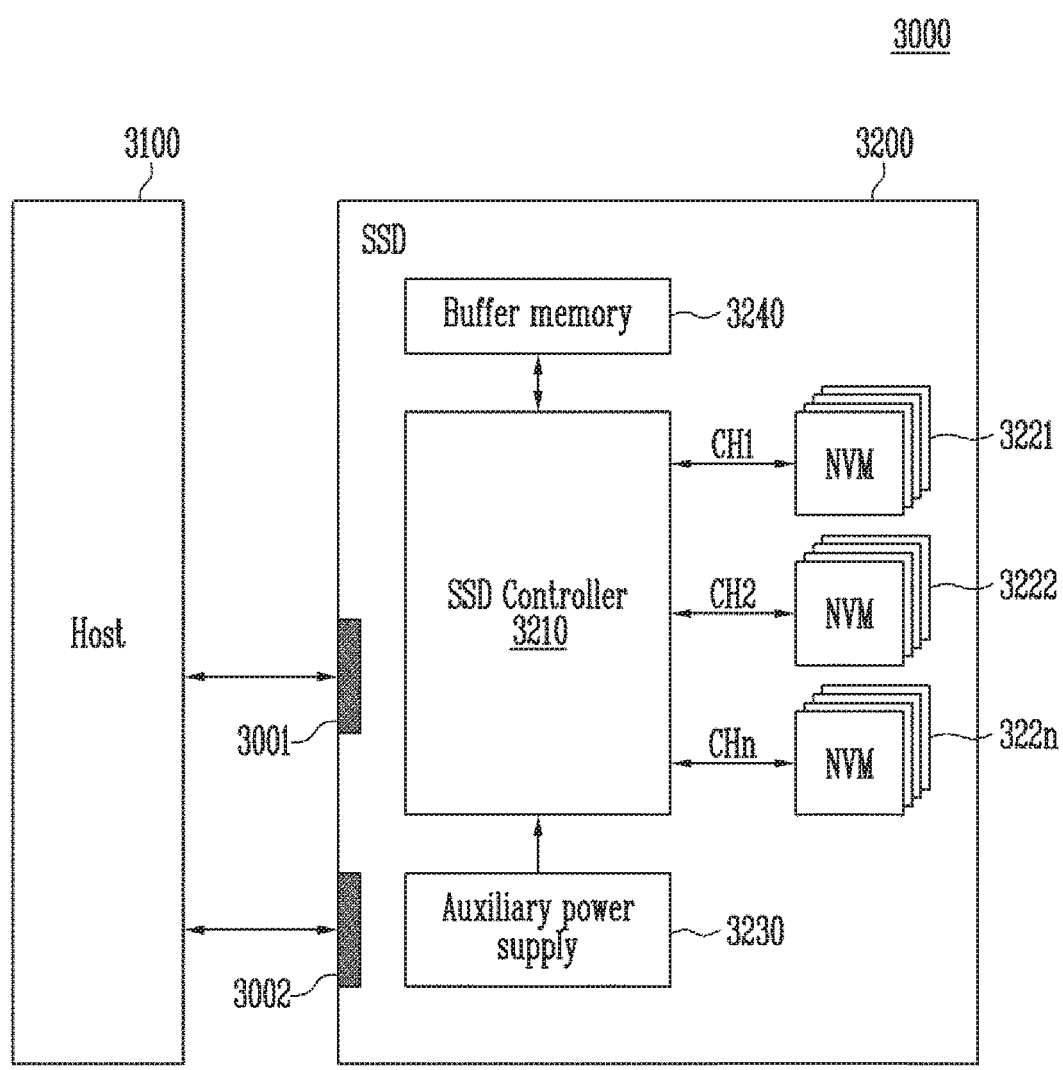
FIG. 16 is a block diagram illustrating a Solid State Drive (SSD) system to which the storage device is applied in accordance with an embodiment of the present disclosure.

FIG. 16 is a block diagram exemplarily illustrating a Solid State Drive (SSD) system to which the storage device is applied in accordance with an embodiment of the present disclosure.

Referring to FIG. 16, the SSD system 3000 includes a host 3100 and an SSD 3200. The SSD 3200 exchanges a signal SIG with the host 3100 through a signal connector 3001, and receives power PWR through a power connector 3002. The SSD 3200 includes an SSD controller 3210, a plurality of flash memories 3221 to 322n, an auxiliary power supply 3230, and a buffer memory 3240.

In an embodiment, the SSD controller 3210 may serve as the memory controller 200 described with reference to FIG. 1.

The SSD controller 3210 may control the plurality of flash memories 3221 to 322n in response to a signal SIG received from the host 3100. In an example, the signal SIG may be a signal based on an interface between the host 3100 and the SSD 3200. For example, the signal SIG may be a signal defined by at least one of interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

The auxiliary power supply 3230 is coupled to the host 3100 through the power connector 3002. When the supply of power from the host 3100 is not smooth, the auxiliary power supply 3230 may provide power of the SSD 3200. In an example, the auxiliary power supply 3230 may be located in the SSD 3200, or be located externally to the SSD 3200. For example, the auxiliary power supply 3230 may be located on a main board, and provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or temporarily store meta data (e.g., a mapping table) of the flash memories 3221 to 322n. The buffer memory 3240 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

Figure 17:
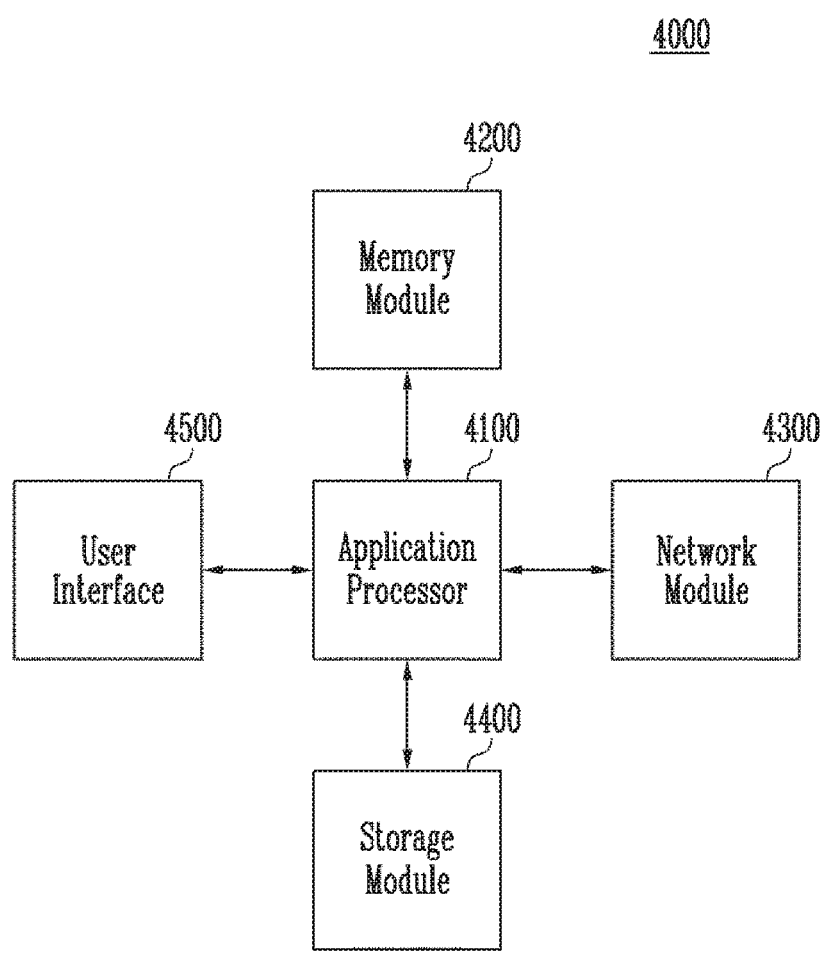
FIG. 17 is a block diagram illustrating a user system to which the storage device is applied in accordance with an embodiment of the present disclosure.

FIG. 17 is a block diagram illustrating a user system to which the storage device is applied in accordance with an embodiment of the present disclosure.

Referring to FIG. 17, the user system 4000 includes an application processor 4100, a memory module 4200, a network module 4300, a storage module 4400, and a user interface 4500.

The application processor 4100 may drive components included in the user system 4000, an operating system (OS), a user program, or the like. In an example, the application processor 4100 may include controllers for controlling components included in the user system 4000, interfaces, a graphic engine, and the like. The application processor 4100 may be provided as a System-on-Chip (SoC).

The memory module 4200 may operate as a main memory, working memory, buffer memory or cache memory of the user system 4000. The memory module 4200 may include volatile random access memories such as a DRAM, an SDRAM, a DDR SDRAM, a DDR2 SDRM, a DDR3 SDRAM, an LPDDR SDRAM, an LPDDR2 SDRAM, and an LPDDR3 SDRAM or nonvolatile random access memories such as a PRAM, a ReRAM, an MRAM, and a FRAM. In an example, the application processor 4100 and the memory module 4200 may be provided as one semiconductor package by being packaged based on a Package on Package (PoP).

The network module 4300 may communicate with external devices. In an example, the network module 4300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, and Wi-Fi. In an example, the network module 4300 may be included in the application processor 4100.

The storage module 4400 may store data. For example, the storage module 4400 may store data received from the application processor 4100. Alternatively, the storage module 4400 may transmit data stored therein to the application processor 4100. In an example, the storage module 4400 may be implemented with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. In an example, the storage module 4400 may be provided as a removable drive such as a memory card of the user system 4000 or an external drive.

In an example, the storage module 4400 may include a plurality of nonvolatile memory devices, and the plurality of nonvolatile memory devices may operate identically to the memory device 100 described with reference to FIGS. 7 to 10. The storage module 4400 may operate identically to the storage device 50 described with reference to FIG. 1.

The user interface 4500 may include interfaces for inputting data or commands to the application processor 4100 or outputting data to an external device. In an example, the user interface 4500 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 4500 may include user output interfaces such as a Liquid Crystal Display (LCD), an Organic Light Emitting Diode (OLED) display device, an Active Matrix OLED (AMOLED) display device, an LED, a speaker, and a monitor.

In accordance with embodiments of the present disclosure, a memory controller configured to execute a recovery code stored in a nonvolatile memory in a normal mode operation, and an operating method of the memory controller are provided.

While the present invention has been shown and described with reference to certain embodiments thereof, it will be understood by those skilled in the art that various changes in form and details may be made therein without departing from the spirit and scope of the present invention as defined by the appended claims and their equivalents. Therefore, the scope of the present invention should not be limited to the above-described embodiments but should be determined not only by the appended claims but also the equivalents thereof.

In the above-described embodiments, steps may be selectively performed or some steps and may be omitted. In each embodiment, the steps are not necessarily performed in accordance with the described order and may be rearranged. The embodiments disclosed in this specification and drawings are only examples to facilitate an understanding of the present invention, and the present invention is not limited thereto. That is, it should be apparent to those skilled in the art that various modifications can be made on the basis of the technological scope of the present disclosure.

Although specific terminologies are used here, those are only to explain the embodiments of the present disclosure. Therefore, the present invention is not restricted to the above-described embodiments; rather, many variations are possible within the spirit and scope of the present disclosure. It should be apparent to those skilled in the art that various modifications can be made on the basis of the technological scope of the present disclosure in addition to the embodiments disclosed herein.

What is claimed is:

1. A memory controller for controlling a data storage device, the memory controller comprising:
   a mode converter configured to determine an operation mode of the data storage device as a normal mode or a sleep mode, according to power sensing information representing a power consumption of the data storage device;
   a recovery code storage configured to store a recovery code for a recovery operation;
   a normal code storage configured to store a normal code for a normal operation; and
   a code executer configured to perform the recovery operation or the normal operation based on the operation mode,
   wherein the mode converter stores a recovery code address indicating a position of the recovery code storage at which the recovery code is stored and a normal code address indicating a position of the normal code storage at which the normal code is stored when the operation mode is changed from the normal mode to the sleep mode.

2. The memory controller of claim 1, wherein the mode converter:
   determines the operation mode to be the sleep mode when the power consumption is less than or equal to a reference consumption; and
   performs first operations for maintaining a power-on state when the operation mode is the sleep mode.

3. The memory controller of claim 2, wherein the mode converter converts the operation mode of the data storage device from the sleep mode to the normal mode when the power consumption exceeds the reference consumption.

4. The memory controller of claim 2, wherein the mode converter outputs a code address request for requesting the recovery code address to the recovery code storage when the mode converter determines to convert the operation mode of the data storage device from the normal mode to the sleep mode.

5. The memory controller of claim 4, wherein the recovery code storage outputs the recovery code address to the mode converter in response to the code address request.

6. The memory controller of claim 3, wherein the mode converter outputs the recovery code address and the normal code address, which are stored therein, to the code executer when the mode converter determines to convert the operation mode of the data storage device from the sleep mode to the normal mode.

7. The memory controller of claim 6, wherein the code executer receives the recovery code corresponding to the recovery code address from the recovery code storage by providing the recovery code storage with a code request along with the recovery code address provided from the mode converter, and performs the recovery operation by executing the received recovery code.

8. The memory controller of claim 6, wherein the code executer determines whether error-containing data stored in the memory controller is error-correctable by executing the recovery code.

9. The memory controller of claim 8, wherein the code executer error-corrects the error-containing data when it is determined that the error-containing data is error-correctable and then receives the normal code corresponding to the normal code address from the normal code storage by providing the normal code storage with a code request along with the normal code address provided from the mode converter.

10. The memory controller of claim 9, wherein the code executer:
    executes the received normal code; and
    outputs a normal mode setting request for allowing the data storage device to operate in the normal mode when the execution of the normal mode code is completed.

11. The memory controller of claim 8, wherein the code executer outputs a reset request for resetting the data storage device when it is determined that the error-containing data is not error-correctable.

12. The memory controller of claim 11, further comprising a reset controller configured to control the data storage device to operate in a booting mode in response to the reset request.

13. A method for operating a memory controller for controlling a data storage device, the method comprising:
    generating power sensing information by sensing a power consumption of the data storage device;
    determining an operation mode of the data storage device as a normal mode or a sleep mode according to the power sensing information; and
    storing a recovery code address indicating a position at which a recovery code is stored and a normal code address indicating a position at which a normal code is stored, based on the operation mode of the data storage device.

14. The method of claim 13, wherein the recovery code address is stored when the operation mode is converted from the normal mode to the sleep mode.

15. The method of claim 14, further comprising executing the recovery code by receiving the recovery code based on the recovery code address when the operation mode is converted from the sleep mode to the normal mode.

16. The method of claim 15, wherein the recovery code address is stored together with the normal code address of the normal code stored in a volatile memory, the normal code to be executed for the data storage device to operate in the normal mode after the recovery code is executed.

17. The method of claim 15, further comprising resetting the data storage device when executing the recovery code is failed.

18. The method of claim 16, wherein the operation mode is determined to be the sleep mode when the power consumption is less than or equal to a reference consumption.

19. The method of claim 18, wherein the determining of the operation mode includes converting from the sleep mode to the normal mode when the power consumption exceeds the reference consumption.

20. An operating method of a controller for controlling a memory device, the operating method comprising:
    copying a code address from a first memory to a second memory when the memory device enters a first mode;
    performing a recovery operation on the memory device by executing a recovery code when the memory device exits the first mode and enters a second mode; and
    performing a normal operation on the memory device by executing a normal code when the recovery operation is succeeded, wherein the recovery code is stored in a nonvolatile memory region indicated by the code address and the normal code is stored in a volatile memory region indicated by the code address, and wherein the first and second memories are included in the controller.

* * * * *